(12) United States Patent
Park et al.

(10) Patent No.: US 11,995,752 B2
(45) Date of Patent: May 28, 2024

(54) ELECTRONIC DEVICE AND METHOD FOR DISPLAYING CHARACTER OBJECT BASED ON PRIORITY OF MULTIPLE STATES IN ELECTRONIC DEVICE

(71) Applicant: Samsung Electronics Co., Ltd., Suwon-si (KR)

(72) Inventors: Miji Park, Suwon-si (KR); Hwan Kim, Suwon-si (KR); Dongsoo Shin, Suwon-si (KR); Jihyun Ahn, Suwon-si (KR); Minkyung Lee, Suwon-si (KR); Jinsoo Jang, Suwon-si (KR); Eunsil Gim, Suwon-si (KR); Miyeon Park, Suwon-si (KR); Joonho Ok, Suwon-si (KR); Jongil Jeong, Suwon-si (KR); Jina Choe, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 50 days.

(21) Appl. No.: 17/858,583

(22) Filed: Jul. 6, 2022

(65) Prior Publication Data

US 2023/0046769 A1    Feb. 16, 2023

Related U.S. Application Data

(63) Continuation of application No. PCT/KR2022/007186, filed on May 19, 2022.

(30) Foreign Application Priority Data

Aug. 6, 2021    (KR) .................. 10-2021-0103924

(51) Int. Cl.
  *G06T 13/00*    (2011.01)
  *G06T 13/40*    (2011.01)

(52) U.S. Cl.
  CPC .......... *G06T 13/40* (2013.01); *G06T 2213/12* (2013.01)

(58) Field of Classification Search
  None
  See application file for complete search history.

(56) References Cited

U.S. PATENT DOCUMENTS

| | | | |
|---|---|---|---|
| 10,530,817 B2 * | 1/2020 | Jeon .................... | H04L 65/1101 |
| 2016/0180590 A1 | 6/2016 | Kamhi et al. | |

(Continued)

FOREIGN PATENT DOCUMENTS

| | | |
|---|---|---|
| JP | 2021-077310 A | 5/2021 |
| KR | 10-2006-0129582 A | 12/2006 |

(Continued)

OTHER PUBLICATIONS

International Search Report with Written Opinion and English translation dated Aug. 19, 2022; International Appln. No. PCT/KR2022/007186.

*Primary Examiner* — Martin Mushambo
(74) *Attorney, Agent, or Firm* — Jefferson IP Law, LLP

(57) ABSTRACT

An electronic device is provided. The electronic device includes a sensor module, a communication module, a display, a memory, and at least one processor configured to identify a plurality of states based on at least one of information obtained through the sensor module, information received from an external electronic device through the communication module, or information associated with a function of the electronic device, identify priorities of the plurality of states, identify a first state among the plurality of states based on the identified priorities, identify whether there is a second state mergeable with the first state, and control the display to display, a first character object corresponding to the first state or a third character object corre- (Continued)

sponding to merge of the first state and the second state, based on whether there is the second state mergeable with the first state.

20 Claims, 23 Drawing Sheets

(56) References Cited

U.S. PATENT DOCUMENTS

| | | |
|---|---|---|
| 2016/0361653 A1 | 12/2016 | Zhang et al. |
| 2018/0113587 A1 | 4/2018 | Allen et al. |
| 2018/0336715 A1* | 11/2018 | Rickwald ............... G06V 20/20 |
| 2019/0339847 A1 | 11/2019 | Scapel et al. |
| 2020/0045571 A1* | 2/2020 | Raleigh ............... H04L 63/0227 |
| 2020/0184843 A1 | 6/2020 | Yoshikawa et al. |
| 2020/0258280 A1 | 8/2020 | Park et al. |
| 2020/0273230 A1* | 8/2020 | Amitay ................... G06T 13/60 |
| 2020/0341539 A1* | 10/2020 | Ke ........................... G06T 7/246 |
| 2021/0090419 A1 | 3/2021 | Roberts et al. |
| 2021/0192823 A1* | 6/2021 | Amitay ................... G01W 1/06 |

FOREIGN PATENT DOCUMENTS

| | | |
|---|---|---|
| KR | 10-2016-0135458 A | 11/2016 |
| KR | 10-2017-0095817 A | 8/2017 |
| KR | 10-2017-0106582 A | 9/2017 |
| KR | 10-2020-0092207 A | 8/2020 |
| KR | 10-2020-0097046 A | 8/2020 |
| KR | 10-2021-0059013 A | 5/2021 |
| KR | 10-2021-0096311 A | 8/2021 |

\* cited by examiner

| Character object data element | Rendered image |
|---|---|
| Character model | 810 |
| Clothes | 820 |
| Additional objects | 831, 832 |

FIG. 8A

| Character object data element | Rendered image |
|---|---|
| Facial motion |  |
| Body motion | |
| Camera motion |  |
| Space |  |
| Graphic panel |  |

| State | 3D animation of character object | | |
|---|---|---|---|
| Play |  |  |  |
| Inactive A |  |  |  |
| Inactive B |  |  |  |
| Run |  |  |  |

| State | 3D animation of character object | | |
|---|---|---|---|
| LowBattery | 10:08 | 10:08 | 10:08 |
| Notice A | 10:08 | 10:08 | 10:08 |
| Notice B | 10:08 | 10:08 | 10:08 |
| Walk | 10:08 | 10:08 | 10:08 |

FIG. 20B

| State | 3D animation of character object | | | |
|---|---|---|---|---|
| Normal A | 10:08 | 10:08 | 10:08 | 10:08 |
| Normal B | | 10:08 | 10:08 | 10:08 |
| Normal C | | 10:08 | 10:08 | 10:08 |

FIG. 20C

ELECTRONIC DEVICE AND METHOD FOR DISPLAYING CHARACTER OBJECT BASED ON PRIORITY OF MULTIPLE STATES IN ELECTRONIC DEVICE

CROSS-REFERENCE TO RELATED APPLICATION(S)

This application is a continuation application, claiming priority under § 365(c), of an International application No. PCT/KR2022/007186, filed on May 19, 2022, which is based on and claims the benefit of a Korean patent application number 10-2021-0103924, filed on Aug. 6, 2021, in the Korean Intellectual Property, the disclosure of which is incorporated by reference herein in its entirety.

TECHNICAL FIELD

The disclosure relates to a method for displaying a character object in an electronic device.

BACKGROUND ART

With the development of electronic information and communication technologies, various functions are being integrated into communication devices or electronic devices, and electronic devices are being implemented to be able to perform an interworking function for interworking with other electronic devices via communication. For example, a portable electronic device (e.g., a smartphone or wearable electronic device) has functions, such as a music play device, image capturing device, or electronic wallet, as well as a communication function, and is being implemented to be able to perform various functions by installing additional applications and to perform functions in conjunction with an external electronic device.

The above information is presented as background information only to assist with an understanding of the disclosure. No determination has been made, and no assertion is made, as to whether any of the above might be applicable as prior art with regard to the disclosure.

DISCLOSURE

Technical Problem

An electronic device may display a character object, as a graphic object that may serve as a user's alter ego. For example, the character object displayed on the electronic device may include an avatar, an emoji, or an emoticon.

Typically, the electronic device may have difficulty in applying various states, occurring inside or outside the electronic device, all or in real-time, to the character object.

For example, various states may simultaneously or sequentially occur inside or outside the electronic device, and a plurality of states may have occurred at a specific time. However, it may be hard for the electronic device to apply all of the plurality of states to the character object in real-time.

Aspects of the disclosure are to address at least the above-mentioned problems and/or disadvantages and to provide at least the advantages described below. Accordingly, an aspect of the disclosure is to provide an electronic device capable of identifying a plurality of states in the electronic device and applying priority-based states among the plurality of states to a character object and a method for displaying a character object based on the priorities of the plurality of states in the electronic device.

Another aspect of the disclosure is to provide an electronic device capable of displaying a character object in a merged state when there are mergeable states among a plurality of states in displaying the character object based on the priorities of the plurality of states and a method for displaying a character object based on the priorities of the plurality of states in the electronic device.

Additional aspects will be set forth in part in the description which follows and, in part, will be apparent from the description, or may be learned by practice of the presented embodiments.

Technical Solution

In accordance with an aspect of the disclosure, an electronic device is provided. The electronic device may include a sensor module, a communication module, a display, a memory, and at least one processor configured to identify a plurality of states based on at least one of information obtained through the sensor module, information received from an external electronic device through the communication module, or information associated with a function of the electronic device, identify priorities of the plurality of states, identify a first state among the plurality of states based on the identified priorities, identify whether there is a second state mergeable with the first state, and control the display to display, a first character object corresponding to the first state or a third character object corresponding to a merge of the first state and the second state, based on whether there is the second state mergeable with the first state.

In accordance with another aspect of the disclosure, a method performed by an electronic device for displaying a character object based on priorities of a plurality of states in the electronic device is provided. The method may include identifying the plurality of states based on at least one of information obtained through a sensor module of the electronic device, information received from an external electronic device through a communication module of the electronic device, or information associated with a function of the electronic device, identifying the priorities of the plurality of states, identifying a first state among the plurality of states based on the identified priorities, identifying whether there is a second state mergeable with the first state, and displaying a first character object corresponding to the first state or a third character object corresponding to a merge of the first state and the second state, based on whether there is the second state mergeable with the first state.

In accordance with another aspect of the disclosure, a non-volatile storage medium storing instructions, which are configured to, when executed by an electronic device, cause the electronic device to perform operations is provided. The operations may include identifying a plurality of states based on at least one of information obtained through a sensor module of the electronic device, information received from an external electronic device through a communication module of the electronic device, or information associated with a function of the electronic device, identifying priorities of the plurality of states, identifying a first state among the plurality of states based on the identified priorities, identifying whether there is a second state mergeable with the first state, and controlling to display a first character object corresponding to the first state or a third character object corresponding to a merge of the first state and the second state, based on whether there is the second state mergeable with the first state.

Advantageous Effects

According to various embodiments of the disclosure, the electronic device may apply various states, inside and outside the electronic device, to a character object according to their priorities, thereby allowing the user to identify her desired state first, through the character object.

Further, according to various embodiments of the disclosure, the electronic device may merge mergeable states among a plurality of states and display the object in the merged state, thereby allowing the user to simultaneously identify several stages through the character object.

Effects of the disclosure are not limited to the foregoing, and other unmentioned effects would be apparent to one of ordinary skill in the art from the following description.

Other aspects, advantages, and salient features of the disclosure will become apparent to those skilled in the art from the following detailed description, which, taken in conjunction with the annexed drawings, discloses various embodiments of the disclosure.

DESCRIPTION OF THE DRAWINGS

The above and other aspects, features, and advantages of certain embodiments of the disclosure will be more apparent from the following description taken in conjunction with the accompanying drawings, in which:

FIG. 8A is a view illustrating an example of a rendered image of character model data, clothes data, and additional object data according to an embodiment of the disclosure;

FIG. 20B is a view illustrating an example of a 3D animation of a character object corresponding to each of a low battery state, a notification state, and a walking state according to an embodiment of the disclosure; and FIG. 20C is a view illustrating an example of a 3D animation of a character object corresponding to an idle state according to an embodiment of the disclosure.

The same reference numerals are used to represent the same elements throughout the drawings.

MODE FOR INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
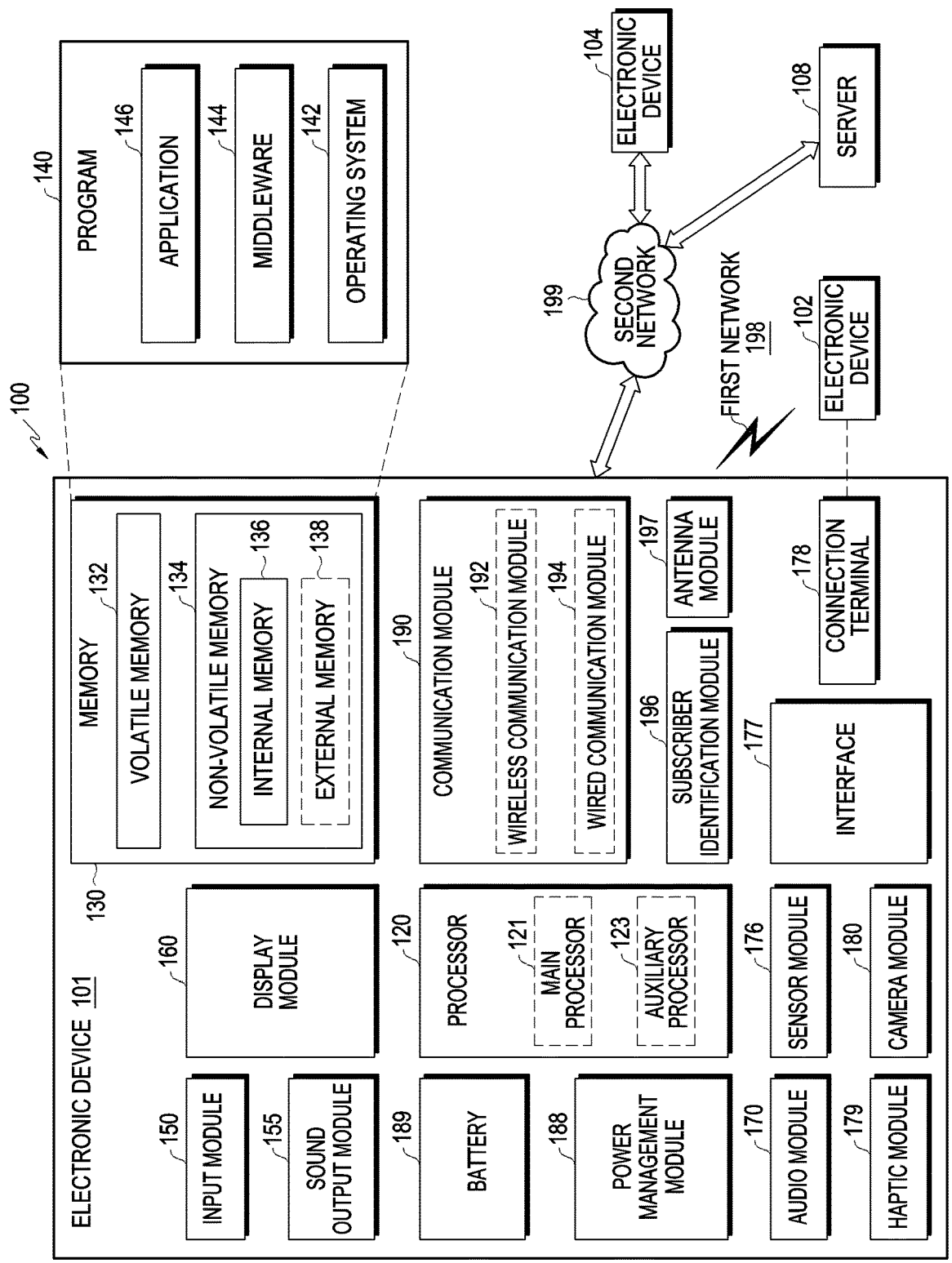
FIG. 1 is a view illustrating a network environment according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with at least one of an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, an SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a fifth generation (5G) network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module 197 may include one antenna including a radiator formed of a conductor or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example.

The electronic device 101 may provide ultra low-latency services using, e.g., distributed computing or mobile edge computing. In another embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or health-care) based on 5G communication technology or IoT-related technology.

Figure 2:
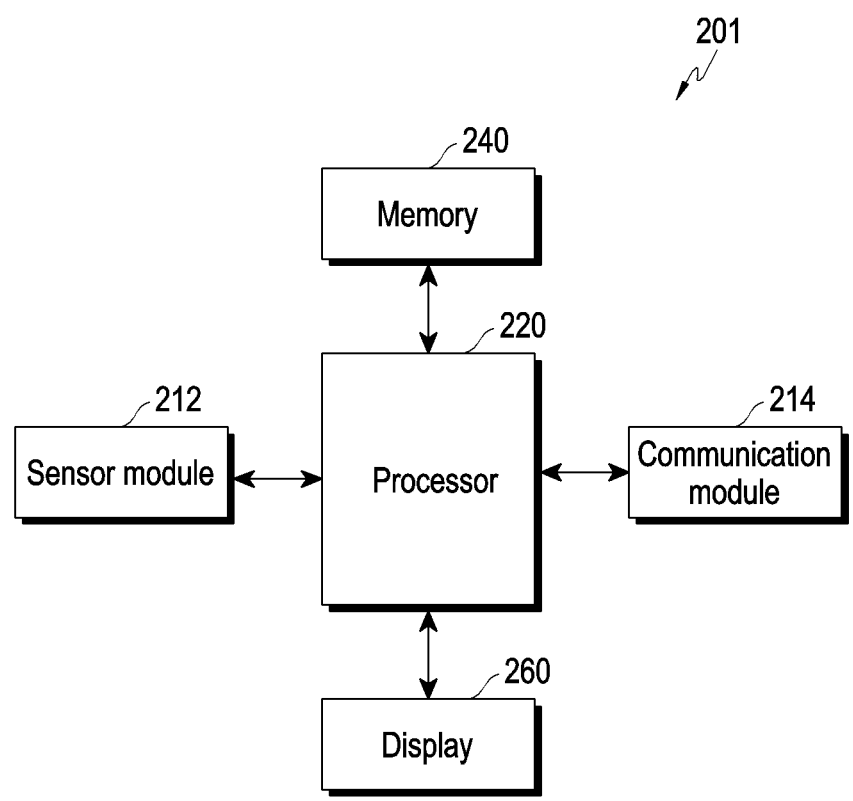
FIG. 2 is a block diagram illustrating an electronic device according to an embodiment of the disclosure.

FIG. 2 is a block diagram illustrating an electronic device according to an embodiment of the disclosure.

Referring to FIG. 2, according to an embodiment, an electronic device 201 (e.g., the electronic device 101 of FIG. 1) may include a sensor module 212, a communication module 214, at least one processor (hereinafter, 'processor') 220, a memory 240, and a display 260. The electronic device 201 is not limited thereto and may add more components or exclude some of the above-described components. According to an embodiment, the electronic device 201 may include the whole or part of the electronic device 101 of FIG. 1.

According to an embodiment, the sensor module 212 may include at least one sensor. For example, the sensor module 212 may include at least one biometric sensor and/or at least one environment sensor.

According to an embodiment, the at least one biometric sensor may include a sensor capable of sensing the user's biometric signal. According to an embodiment, the at least one biometric sensor may include a photoplethysmography (PPG) sensor, a body temperature sensor, an electrocardiogram (ECG) sensor, an electrodermal activity (EDA) sensor, and/or a SWEAT sensor, and may further include other sensors associated with biometric sensing. For example, the PPG sensor may include a pulse oximeter or an optical blood flow measurement sensor, and it may perform sensing using reflected light incident on the bloodstream to measure heart rate (or pulse rate (number)) and blood oxygen saturation. According to an embodiment, the body temperature sensor may measure the body temperature. According to an embodiment, the ECG sensor may measure the electrocardiogram by sensing an electrical signal from the heart through electrodes attached to the body. According to an embodiment, the EDA sensor may include, e.g., a galvanic skin response (GSR) sensor and may sense the skin electrical activity to measure the user's arousal state. According to an embodiment, the SWEAT sensor may measure the degree of hydration and/or dehydration by sensing the sweat of the user's body. According to an embodiment, the at least one biometric sensor may provide the processor 220 with the biometric signal measured by sensing the user's biometric signal based on the control of the processor 220 or biometric signal-based information (value or numerical value) (e.g., heart rate, blood pressure, oxygen saturation, electrocardiogram, stress, degree of arousal, body temperature, degree of hydration, degree of dehydration, and/or other biometric signal-based information) measured by sensing the user's biometric signal.

According to an embodiment, the at least one environment sensor may include a sensor for sensing the ambient environment of the user carrying the electronic device 201 or the ambient environment of the electronic device 201 or for sensing the motion of the user carrying the electronic device 201 or the motion of the electronic device 201. For example, the at least one environmental sensor may include a barometer, ambient temperature, ambient humidity, global positioning system (GPS), pressure sensor, altimeter, motion sensor, and/or proximity sensor, and may further include at least one other sensor for sensing the ambient environment of the electronic device 201 or the environment of the user carrying the electronic device 201 or for sensing the motion of the electronic device 201 or the motion of the user carrying the electronic device 201. According to an embodiment, the barometer may sense atmospheric pressure as an atmospheric pressure gauge. The ambient temperature may sense the ambient temperature. According to an embodiment, the GPS may sense the position of the electronic device 201 or the user of the electronic device 201. According to an embodiment, the pressure sensor may sense the pressure applied to the electronic device 201. According to an embodiment, the altimeter may sense the altitude. According to an embodiment, the motion sensor may sense the motion of the electronic device 201 or the motion of the user carrying the electronic device 201. For example, the motion sensor may include an acceleration sensor and/or a gyro sensor, and may further include a geomagnetic sensor.

The acceleration sensor may sense an acceleration or an impact caused by movement of the electronic device 201 or the user carrying the electronic device 201. The gyro sensor may sense the rotation direction or rotation angle of the electronic device 201 due to a movement of the user carrying the electronic device 201. The geomagnetic sensor may sense the direction of the geomagnetism. For example, the motion sensor may identify whether the electronic device 201 or the user carrying the electronic device 201 moves using the acceleration sensor and, in a moving state, identify the user's motion using the gyro sensor. For example, the geomagnetic sensor may be used to further identify the progress direction of the user's motion. According to an embodiment, the proximity sensor may sense the proximity of an object to the electronic device 201. According to an embodiment, the at least one environment sensor may provide the processor 220 with various sensing information (values or numerical values) (e.g., atmospheric pressure value, temperature value, humidity value, position, pressure value, altitude value, rotation direction and rotation angle, motion sensing information and/or degree of proximity) measured by sensing the ambient environment of the electronic device 201 or the ambient environment of the user carrying the electronic device 201 based on the control of the processor 220 or by sensing the motion of the electronic device 201 or the motion of the user carrying the electronic device 201.

According to an embodiment, the communication module 214 may communicate with an external electronic device (e.g., the electronic device 102 or 104 of FIG. 1, the server 108 of FIG. 1, or another user's electronic device or an external wearable electronic device connectable with the electronic device 101). For example, the communication module 214 may receive, from the external electronic device, information associated with performing the function of the external electronic device or biometric sensing information and/or environment sensing information. According to an embodiment, the communication module 214 may include a cellular module, a Wi-Fi module, a Bluetooth module, or a near-field communication (NFC) module. Further, other modules capable of communicating with the external electronic device may be further included.

According to an embodiment, the processor 220 may identify (or determine or confirm) a plurality of states of the electronic device 201 based on the information associated with the function of the electronic device 201, information obtained through the sensor module 212, and/or information received from the external electronic device (e.g., the electronic device 102 or 104 or server 108 of FIG. 1) through the communication module 214. For example, the information associated with the function of the electronic device 201 may include schedule information, notification information, information related to execution of application, remaining battery level, and/or charging-related information, obtained by a scheduling function, a notification function, a function of executing an application (e.g., a music play application, video play application, web browser application, message transmission/reception application, call application, and/or other applications), and/or power management function and may further include information associated with any function that is executed by the processor 220. For example, the information obtained through the sensor module 212 and/or the information received from the external electronic device through the communication module 214 may include biometric sensing information, environment sensing information, and/or information associated with performing the function of the external electronic device and may further include other information.

According to an embodiment, the processor 220 may identify, in real-time, a plurality of states including at least some or all of the state of the electronic device, the state of the user of the electronic device, the state of the external electronic device connected with or communicating with the electronic device, the state of the ambient environment of the electronic device, and/or other states identifiable by the processor 220, based on the information associated with the function of the electronic device 201, information obtained through the sensor module 212, and/or information received from the external electronic device through the communication module 214.

According to an embodiment, the processor 220 may identify a plurality of states generated in chronological from a designated reference time of the electronic device 201 (e.g., when powered on, when the standby state ends, or a time according to another reference) and generate and/or store state information or state list (e.g., a stacked state list). The processor 220 may add a new state to the state list when entering the new state according to the state enter condition or delete an exited state from the state list when the existing state is exited according to the state exit condition, thereby updating the state list in real-time According to an embodiment, the processor 220 may identify the character object corresponding to each of the plurality of states on the state list. For example, the character object may include an avatar, an emoji, or an emoticon and may include a two-dimensional (2D) graphic image and/or a three-dimensional (3D) animation. For example, data corresponding to various character objects may be generated by the processor 220 or previously stored in the memory 240.

According to an embodiment, the processor 220 may identify (determine or confirm) the priorities of the plurality of states on the state list. According to an embodiment, the processor 220 may identify the priority of each of the plurality of states on the list based on a designated priority reference. For example, the designated priority reference may include chronological order, importance, user preference, or level value of each state. According to an embodiment, the processor 220 may identify the priority of each of the plurality of states on the state list based on one or more references among designated priority references. For example, the processor 220 may determine the priority of each of the plurality of states in order from latest to oldest according to chronological order, determine the priority of each of the plurality of states in order from most importance to least importance according to order of importance, determine the priority of each of the plurality of states in order from highest user preference to lowest user preference, or determine the priority of each of the plurality of states in order of highest state level value to lowest state level value. According to an embodiment, the processor 220 may also determine the priority of each of the plurality of states using a plurality of references (e.g., two or more references) among chronological order, importance, user preference, and level value of each state. For example, the processor 220 may also determine the priority of each of the plurality of states based on other priority references than the chronological order, importance, user preference, or level value of each state.

According to an embodiment, the processor 220 may identify a first state to be displayed on the display 260 based on the priorities of the plurality of states. For example, the processor 220 may identify the highest-priority state among the plurality of states as the first state to be displayed on the display 260.

According to an embodiment, the processor 220 may identify whether there is at least one other state that may be merged with the first state to be displayed on the display 260, among the plurality of states. According to an embodiment, the processor 220 may identify whether there is at least one other state (e.g., a second state) mergeable with the first state based on a designated mergeable condition. For example, the mergeable condition may include when the second state includes a data element not overlapping the data elements of the character object of the first state, when the second state includes a data element replaceable (or changeable) among the data elements of the character object of the first state, or when the second state includes a data element not colliding (or not conflicting or compatible) with the data elements of the character object of the first state.

For example, when the second state includes a data element not overlapping the data elements of the character object of the first state may include when the second state includes second additional object data not overlapping first additional object data of the character object of the first state, when the second state includes additional object data addable to the data elements of the character object of the first state, or when the second state includes graphic panel data addable to the data elements of the character object of the first state.

For example, when the second state includes a data element replaceable among the data elements of the character object of the first state may include when at least some of the object data elements of the first state are replaceable with object data elements of the second state or when the second state may include other elements that may change (or replace) some elements (or a plurality of elements) among the object data elements of the first state. For example, if the clothes element of the object data elements of the first state (everyday state) is everyday clothes, and the second state (bedtime state) includes pajamas, into which the everyday clothes are changeable, as the clothes element, the bedtime state may be identified as mergeable with the everyday state. As another example, if the space element of the character object of the object data element of the first state (rest state) is a first space element (e.g., a space indicating the rest state), and the second state (state of having traveled abroad) includes a second space element (e.g., a space indicating the foreign country) into which the first space is changeable, as the space element of the character object, the rest state may be identified as mergeable with the state of having traveled abroad.

For example, when the second state includes a data element not colliding (or not conflicting or compatible) with the data elements of the character object of the first state may include when the data element of the character object of the first state includes a face motion and a body motion, and the data element of the character object of the second state includes an additional object, not conflicting with the face motion and body motion, (e.g., an earphone, Bluetooth (BT) speaker, accessory, glasses, and/or at least one other body (face or body)-wearable or carriable object) or when the data element of the first state (face motion and body motion) and the data element of the second state (additional object) are mergeable.

According to an embodiment, if the first state is merged with at least one other state, the processor 220 may change the priorities of the plurality of states based on the merge. For example, when the first state and the second state are merged, the processor 220 may change the priority of the merged state (merged first state and second state) to have a corresponding priority based on the higher priority of the first state and the second state or change the priorities of the plurality of states so that the merged state (merged first state and second state) have the highest priority or have a higher than those of the first state and the second state.

According to an embodiment, upon failing to identify the presence of at least one other state mergeable with the first state among the plurality of states, the processor 220 may display the first character object corresponding to the first state on the display 260. For example, if the first state is a running state, the processor 220 may render (display) a running character object on the display 260 based on the data element of the first character object corresponding to the first state.

According to an embodiment, upon identifying the presence of at least one other state mergeable with the first state among the plurality of states, the processor 220 may display a second character object corresponding to the merge of the first state and at least one other state. For example, if the first state is the running state, and another mergeable state is an earphone (or BT earphone)-worn state (e.g., hearing via Buds), the processor 220 may merge the data element of the first character object corresponding to the running state and the data element of the second character object corresponding to the earphone-worn state and render (display) a character object, which runs while wearing the earphone, on the display 260 based on the merged data element.

The memory 240 according to an embodiment may store an application. For example, the memory 240 may store an application (function or program) related to character object display. According to an embodiment, the memory 240 may store a plurality of pre-obtained states and a data element corresponding to the character object of each of the plurality of states. According to an embodiment, the memory 240 may store various data generated during execution of the program 140, as well as a program (e.g., the program 140 of FIG. 1) used for functional operation. The memory 240 may include an area for program 140 and an area for data (not shown). The area for program 140 may store relevant program information for driving the electronic device 201, such as an operating system (OS) (e.g., the OS 142 of FIG. 1) for booting the electronic device 201. The area for data (not shown) may store transmitted and/or received data and generated data according to an embodiment. Further, the memory 240 may include at least one storage medium of a flash memory, a hard disk, a multimedia card, a micro-type memory (e.g., an SD or an extreme digital (xD) memory), a random access memory (RAM), or a read-only memory (ROM).

The display 260 according to an embodiment may display various types of information based on the control of the processor 220. For example, the display 260 may display a user interface screen for displaying a character object. According to an embodiment, the display 260 may be implemented as a touchscreen display. The display 260, when implemented together with an input module in the form of a touchscreen display, may display various information generated according to the user's touch. According to an embodiment, the display 260 may include at least one of a liquid crystal display (LCD), a thin film transistor LCD (TFT-LCD), an organic light emitting diode (OLED) display, a light emitting diode (LED) display, an active matrix organic LED (AMOLED) display, a micro LED display, a mini LED display, a flexible display, or a three-dimensional display. Some of the displays may be configured in a transparent type or light-transmissive type allowing the outside to be viewed therethrough. This may be configured in the form of a transparent display including a transparent OLED (TOLED) display. According to another embodiment, the electronic device 201 may further include another mounted display module (e.g., an extended display or a flexible display) in addition to the display 260.

According to an embodiment, the electronic device 201 is not limited to the configuration illustrated in FIG. 2 and may further include various components. According to an embodiment, the electronic device 201 may further include an image processing module (not shown). The image processing module may perform 2D or 3D image processing and/or rendering operations based on the control of the processor 220.

In the foregoing embodiment, major components of the electronic device 201 have been described above in connection with FIG. 2. According to an embodiment, however, all of the components of FIG. 2 are not essential components, and the electronic device 201 may be implemented with more or less components than those shown.

According to an embodiment, at least some components of the electronic device 201 may be included in a smartphone, and some other components may be included in a wearable device (e.g., a smart watch, augmented reality glasses, or virtual reality glasses). The smartphone and the wearable device may perform operations performed on the electronic device 201 through interworking through communication. For example, a character object generated using the sensor module 212, communication module 214, at least one processor (hereinafter, 'processor') 220, and memory 240 by the smartphone may be transferred to the wearable device and be displayed on the display 260 of the wearable device, or a character object generated using the sensor module 212, communication module 214, at least one processor (hereinafter, 'processor') 220, and memory 240 by the wearable device may be transferred to the smartphone and be displayed on the display 260 of the smartphone. Or, the smartphone may receive some information (e.g., biometric sensing information) from the wearable device, compile the received information and generate a character object, and transfer the generated character object to the display of the wearable device to be displayed on the display of the wearable device.

According to various embodiments, an electronic device (e.g., the electronic device 101 of FIG. 1 or the electronic device 201 of FIG. 2) may comprise a sensor module (e.g., the sensor module 176 of FIG. 1 or the sensor module 212 of FIG. 2), a communication module (e.g., the communication module 190 of FIG. 1 or the communication module 214 of FIG. 2), a display (e.g., the display module 160 of FIG. 1 or the display 260 of FIG. 2), a memory (e.g., the memory 130 of FIG. 1 or the memory 240 of FIG. 2), and at least one processor (e.g., the processor 120 of FIG. 1 or the processor 220 of FIG. 2) configured to identify a plurality of states based on at least one of information obtained through the sensor module, information received from an external electronic device through the communication module, or information associated with a function of the electronic device, identify priorities of the plurality of states, identify a first state among the plurality of states based on the identified priorities, identify whether there is a second state mergeable with the first state, and control the display to display a first character object corresponding to the first state or a third character object corresponding to a merge of the first state and the second state, based on whether there is the second state mergeable with the first state.

According to various embodiments, at least one of the first character object or the third character object may include a 3D animation.

According to various embodiments, the at least one processor may be further configured to obtain a state list including the plurality of states.

According to various embodiments, the at least one processor may be further configured to add a new state to the state list upon identifying entry into the new state based on a state enter condition and delete an existing state from the state list upon identifying exit from the existing state based on a state exit condition.

According to various embodiments, the at least one processor may be further configured to identify the priorities of the plurality of states on the state list based on a designated priority reference.

According to various embodiments, the designated priority reference may include at least one of chronological order, importance, user preference, or a level value of each state.

According to various embodiments, the plurality of states may include at least one of a state of the electronic device, a state of the external electronic device, a user state, or an ambient environment state.

According to various embodiments, the at least one processor may be further configured to obtain a first character object data element for rendering the first character object corresponding to the first state and control the display to display, the first character object using the obtained first character object data element.

According to various embodiments, the first character object data element may include at least one of a character model, clothing, an additional object, a face motion, a body motion, a camera motion, a space, or a graphic panel.

According to various embodiments, the at least one processor may be further configured to obtain a first character object data element for rendering the first character object corresponding to the first state and a second character object data element for rendering a second character object corresponding to the second state, merge at least part of the first character object data element and at least part of the second character object data element, and control the display to display the third character object corresponding to the merge.

Figure 3:
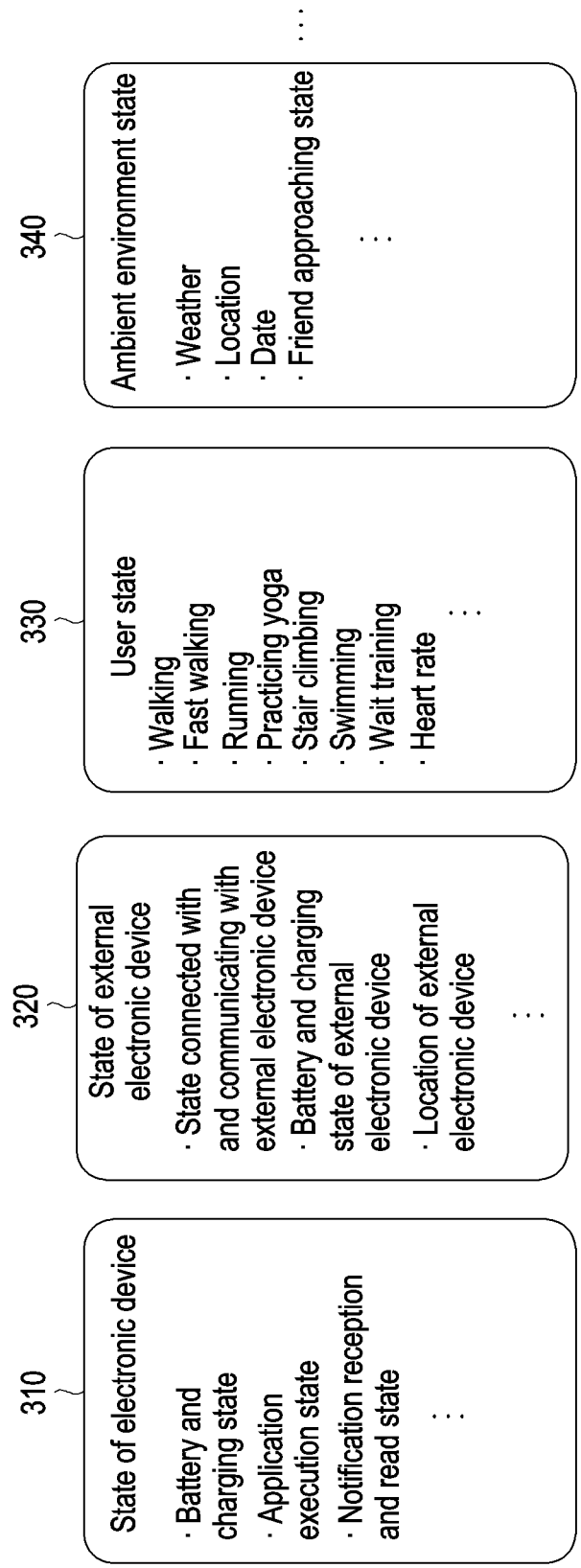
FIG. 3 is a view illustrating an example of a plurality of states identifiable in an electronic device according to an embodiment of the disclosure.

FIG. 3 is a view illustrating an example of a plurality of states identifiable in an electronic device according to an embodiment of the disclosure.

Referring to FIG. 3, according to an embodiment, the processor (e.g., the processor 120 of FIG. 1 or the processor 220 of FIG. 2) of the electronic device (e.g., the electronic device 101 of FIG. 1 or the electronic device 201 of FIG. 2)) may identify a plurality of states based on information associated with the function of the electronic device 201 or information obtained through the sensor module 212 or received from an external electronic device (e.g., the electronic device 104 of FIG. 1 or the server 108 of FIG. 1) through the communication module 214. The plurality of states identifiable by the processor 220 may include the state 310 of the electronic device, the state 320 of the external electronic device, the user state 330, and/or the ambient environment state 340 and may further include other states identifiable by the processor 220.

According to an embodiment, the state 310 of the electronic device may include the battery and charging state (e.g., low battery state), application (e.g., music play application, video play application, web browser application, message transmission/reception application, call application, and/or other applications) execution state (e.g., play state, web browsing state, message transmission/reception state, call state, and/or other application execution states), and/or notification reception and read/unread state (e.g., notification state) and may further include other states of the electronic device.

According to an embodiment, the state 320 of the external electronic device may include the worn state of the external electronic device, connection (or interworking) state with the external electronic device (e.g., hearing via speaker (BT speaker) state or hearing via earphone (BT earphone) state, home appliance (TV, refrigerator, lamp, washer, dryer, or other home appliances) connection state, home appliance interworking (or control) state or other IoT device connected or interworking state), battery and charging state of the external electronic device (e.g., earphone low battery state), and/or positioned state of the external electronic device with respect to the position of the electronic device (e.g., the electronic device (or user)), and may further include other states according to the operation of the external electronic device.

According to an embodiment, the user state 330 may include the state (e.g., health state, exercise state, posture state, and/or other states) measured based on the information obtained through the sensor module 212 (e.g., at least one biometric sensor and/or at least one environment sensor). For example, the user state 330 may include a walking state, a fast walking state, a running state, a yoga practicing state, a stair climbing state, a swimming state, a weight training state (e.g., dumbbell exercising) state, and/or a heart rate monitoring state, and may further include the user's other states measurable based on the information obtained through the sensor module 212.

According to an embodiment, the ambient environment state 340 may include a weather state, a location state, a date state, and/or a friend approaching state and may further include other ambient environment states.

According to an embodiment, the plurality of states may not be limited to the above-described examples of the state 310 of the electronic device, the state 320 of the external electronic device, the user state 330, and/or the ambient environment state 340, and the states included in each of state 310 of the electronic device, the state 320 of the external electronic device, the user state 330, and/or the ambient environment state 340 may not be limited to the above-described examples.

According to an embodiment, the processor 220 may identify each of the plurality of states based on a state entry condition for identifying a new state and a state exit condition for identifying the terminated state and may identify a state which the electronic device 201 newly enters or terminates and identify the plurality of states (e.g., states in the state list) of the first time (e.g., current time). According to an embodiment, the processor 220 may further identify the level of each state. For example, the level of each state may mean a level value for indicating which one of the levels divided in each state is, and the level value may include the percent (%), time, count, and/or numerical value associated with the level of each state. For example, the level value of each state may be designated per state by the user or manufacturer or selectively used and is changeable.

Table 1 shows the state enter conditions, state exit conditions, and the respective levels of the plurality of states according to an embodiment.

TABLE 1

| State type | State | State enter condition | State exit condition | Level |
|---|---|---|---|---|
| State of electronic device | idle | no state identified | one or more states identified | none |
| | low battery | battery level 150% or less | battery level over 15% | level 1 (remaining battery over 10% and below 15%), level 2 (remaining battery over 5% and bellow 10%), level 3 (remaining battery below 5%) |
| | inactive alert | no user motion detected for predetermined time or longer | user motion detected | level 1 (no motion for one hour or longer and less than one and a half hour), level 2 (no motion for one and a half hour or longer and less than two hours), level 3 (no motion for two hours or longer and less than four hours), level 4 (no motion for four hours or longer) |
| | unread notification | 1 or more unread notifications | no unread notification | level 1 (one or more, and five or less notifications) level 2 (more than five, and ten or more notifications) |
| | play | start playing music and/or video | pause playing music and/or video | level 1 (bpm 80 or less) level 2 (over bpm 80 and below 100), level 3 (over bpm 100 and below 120) |

TABLE 1-continued

| State type | State | State enter condition | State exit condition | Level |
|---|---|---|---|---|
| state of external electronic device | hearing via BT speaker | play music and/or video through BT speaker | pause playing music and/or video through BT speaker | |
| | hearing via earphone | play music and video in earphone-worn state | pause playing music and video in earphone-worn state | |
| user state | walking | user starts walking | user stops walking | level 1 (walking 10 minutes or less), level 2 (walking more than 10 minutes and 30 minutes or more), level 3 (walking more than 30 minutes and one hour or more) |
| | running | user starts running | user stops running | level 1 (running 10 minutes or less), level 2 (running more than 10 minutes and 20 minutes or less), level 3 (running more than 20 minutes and 30 minutes or less) |
| | heart rate monitoring | user's heart rate 100 or more | user's heart rate less than 100 | level 1 (heart rate 100 or more and less than 130), level 2 (heart rate 130 or more) |
| ambient environment state | weather state | weather notification | terminate weather notification | |
| | friend approaching state | friend approaches within 50 m | friend leaves 50 m away | |

Referring to Table 1, the processor 220 may identify the state of the electronic device based on information associated with the function of the electronic device 201. Table 1 shows an example including, as the state of the electronic device, idle state, low battery state, inactive alert state, unread notification state, and/or play state, but may further include other states. According to an embodiment, if there is no identified state based on a default function, the processor 220 may identify entry into the idle state and, if there are one or more identified states, identify exit from the idle state. According to an embodiment, based on the power management function, if the power level of the battery (e.g., the battery 189 of FIG. 1) of the electronic device 201 is 15% or less, the processor 220 may identify entry into the low battery state and, if the power level of the battery exceeds 15%, identify the exit from the low battery state. For example, based on a decrease of the battery power level from 15%, the processor 220 may identify the level of the low battery state as level 1 (remaining battery more than 10% and 15% or less), level 2 (remaining battery more than 5% and 10% or less), and level 3 (remaining battery 5% or less). The battery power levels may be divided into more or fewer levels, as an example, and a different reference may be applied to each level. According to an embodiment, based on the motion detection function, if no user motion is detected for a predetermined time or longer, the processor 220 may identify entry into the inactive alert state and, if a user motion is detected, identify exit from the inactive alert state. For example, the processor 220 may further identify the motion level in the inactive alert state based on the time during which no motion is detected. For example, the processor 220 may identify the motion level in the inactive alert state, as level 1 (no motion for one hour or longer and less than one and a half hour), level 2 (no motion for one and a half hour or longer and less than two hours), level 3 (no motion for two hours or longer and less than four hours), and level 4 (no motion for four hours or longer). The motion levels may be divided into more or fewer levels, or a different reference may be applied to each level. According to an embodiment, based on the notification function of the electronic device 201, if the number of unread notifications is one or more, the processor 220 may identify entry into the unread notification state and, if there is no unread notification, identify the exit from the unread notification state. For example, the processor 220 may further identify the level of the notification state in the unread notification state. For example, based on the number of unread notifications, the processor 220 may identify the level of the notification state as level 1 (one or more and five or less notifications) and level 2 (more than five and ten or less notifications). The notification state levels may be divided into more or fewer levels, or a different reference may be applied to each level.

According to an embodiment, based on the music and/or video play function, if music and/or video play starts on the electronic device 201, the processor 220 may identify entry into the play state and, if music and/or video play ends, identify exit from the play state. For example, the processor 220 may further identify the level of the play state. For example, based on the speed (e.g., beats per minute (bpm)) of the playing music and/or video, the processor 220 may identify the level of the play state as level 1 (bpm 80 or less), level 2 (bpm more than 80 and 100 or less), and level 3 (bpm 100 or more and 120 or less). The play state levels may be divided into more or fewer levels, or a different reference may be applied to each level.

According to an embodiment, the processor 220 may further identify other states of the electronic device based on information associated with other functions of the electronic device 201 than the above-described functions.

According to an embodiment, the processor 220 may identify the state of the external electronic device connected with or communicating with the electronic device 201 based on the information received through the communication module 214. Table 1 shows an example in which the state of the external electronic device includes the hearing via BT speaker state and/or hearing via earphone state, but may further include other states. According to an embodiment, if music and/or video play starts through the BT speaker, the processor 220 may identify entry into the hearing via BT speaker state and, if music and/or video play through the BT speaker pauses, identify exit from the hearing via BT speaker state. For example, if music and video play start in the earphone-worn state, the processor 220 may identify entry into the hearing via earphone state and, if music and video play pauses in the earphone-worn state, identify exit from the hearing via earphone state. According to an embodiment, the processor 220 may further identify the state of an external electronic device other than the BT speaker and earphone.

According to an embodiment, the processor 220 may identify the user state based on the information obtained through the sensor module 212 and/or the information received from the external electronic device through the communication module 214, and Table 1, although showing an example in which the user state includes the walking state, running state, and/or heart rate monitoring state, may further include other states.

According to an embodiment, upon identifying the user's walking based on the information obtained through the sensor module 212 and/or the information received from the external electronic device through the communication module 214, the processor 220 may identify entry into the walking state and, upon identifying the end of the user's walking, identify exit from the walking state. For example, the processor 220 may further identify the level of the walking state in the walking state. For example, based on the time during which the user has walked from the start of walking, the processor 220 may identify the level of the walking state as level 1 (walking 10 minutes or less), level 2 (walking more than 10 minutes and 30 minutes or less), and level 3 (walking more than 30 minutes and one hour or less). The walking state levels may be divided into more or fewer levels, or a different reference may be applied to each level.

According to an embodiment, upon identifying the user's running based on the information obtained through the sensor module 212 and/or the information received from the external electronic device through the communication module 214, the processor 220 may identify entry into the running state and, upon identifying the stop of the user's running, identify exit from the running state. For example, the processor 220 may further identify the level of the running state. For example, based on the time during which the user has run from the start of running, the processor 220 may identify the level of the running state as level 1 (running 10 minutes or less), level 2 (running more than 10 minutes and 20 minutes or less), and level 3 (running more than 20 minutes and 30 minutes or less). The running state levels may be divided into more or fewer levels, or a different reference may be applied to each level.

According to an embodiment, upon identifying that the user's heart rate is 100 or more based on the information obtained through the sensor module 212 and/or the information received from the external electronic device through the communication module 214, the processor 220 may identify entry into the heart rate monitoring state and, upon identifying that user's heart rate is less than 100, identify exit from the heart rate monitoring state. For example, the processor 220 may further identify the level of the heart rate monitoring state. For example, based on the heart rate value detected in the heart rate monitoring state, the processor 220 may identify the level of the heart rate monitoring state as level 1 (heart rate 100 or more and less than 130) and level 2 (heart rate 130 or more). The levels of the heart rate monitoring state may be divided into more or fewer levels, or a different reference may be applied to each level.

According to an embodiment, the processor 220 may identify some user states among the walking state, running state, and heart rate monitoring state or may further identify other user states.

According to an embodiment, the processor 220 may identify the ambient environment state based on the information obtained through the sensor module 212 and/or the information received from the external electronic device through the communication module 214, and Table 1, although showing an example in which the ambient environment state includes the weather state and/or friend approaching state, may further include other states. For example, upon identifying a weather notification based on the information obtained through the sensor module 212 and/or the information received from the external electronic device through the communication module 214, the processor 220 may identify entry into the weather notification state and, upon identifying the end of the weather notification, identify exit from the weather notification state. For example, based on the information obtained through the sensor module 212 and/or information received from the external electronic device through the communication module 214, upon identifying a friend's approach within 50 m, identify the friend approaching state and, if the friend leaves 50 m away, identify the exit from the friend approaching state.

Figure 4A:
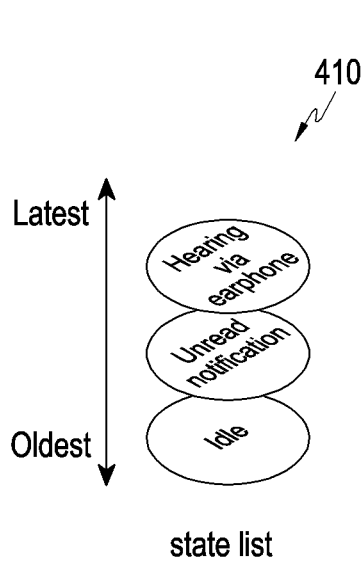
FIG. 4A is a view illustrating an example of a first state list indicating a plurality of states in an electronic device according to an embodiment of the disclosure.
Figure 4B:
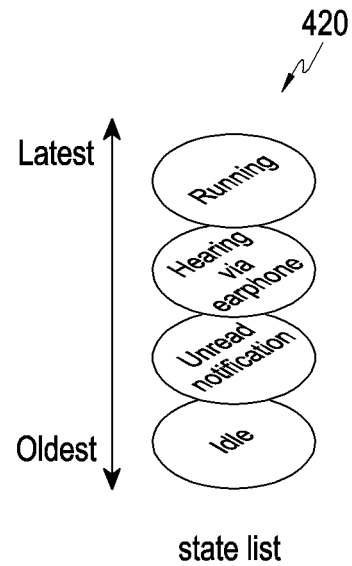
FIG. 4B is a view illustrating an example of a second state list in which a new state occurs in an electronic device according to an embodiment of the disclosure.
Figure 4C:
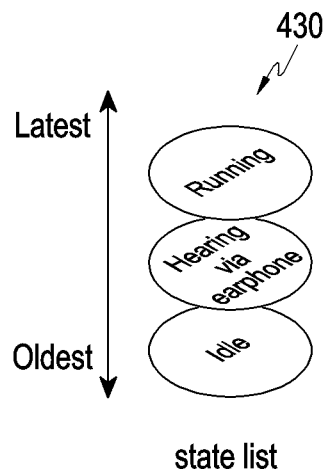
FIG. 4C is a view illustrating an example of a third state list in which an existing state has be extinguished according to an embodiment of the disclosure.

FIGS. 4A, 4B, and 4C are views illustrating an example of a state list indicating a plurality of states in an electronic device according to various embodiments of the disclosure.

FIG. 4A is a view illustrating an example of a first state list indicating a plurality of states in an electronic device according to an embodiment of the disclosure. FIG. 4B is a view illustrating an example of a second state list in which a new state is generated in an electronic device according to an embodiment of the disclosure. FIG. 4C is a view illustrating an example of a third state list in which an existing state is extinguished according to an embodiment of the disclosure.

Referring to FIG. 4A, according to an embodiment, the processor 220 may identify states, occurring from a designated reference time (e.g., from when powered on, when the standby state is terminated, or a time according to another reference), at the times of occurrences and may obtain a first state list 410 including states (e.g., idle state, unread notification state, and hearing via Buds state) present at a first time (e.g., current time).

Referring to FIG. 4B, according to an embodiment, the processor 220 may obtain a second state list 420 in which the running state is added to the first state list based on entry into a new state (e.g., running state) according to the state enter condition while maintaining the first state list.

Referring to FIG. 4C, according to an embodiment, the processor 220 may generate (or identify or determine) a third state list 430 in which the unread notification state has been excluded from the second state list based on the exit from at least one existing state (e.g., unread notification state) according to the state exit condition while maintaining the second state list.

Figure 5A:
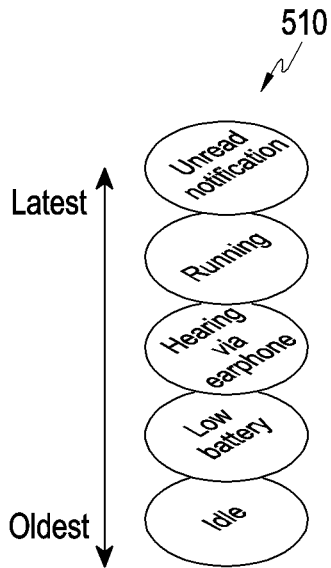
FIG. 5A is a view illustrating an example of identifying the priorities of a plurality of states based on chronological according to an embodiment of the disclosure.
Figure 5B:
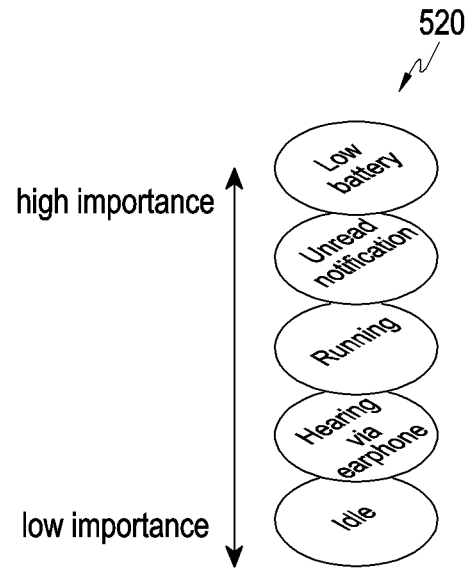
FIG. 5B is a view illustrating an example of identifying the priorities of a plurality of states based on order of importance according to an embodiment of the disclosure.
Figure 5C:
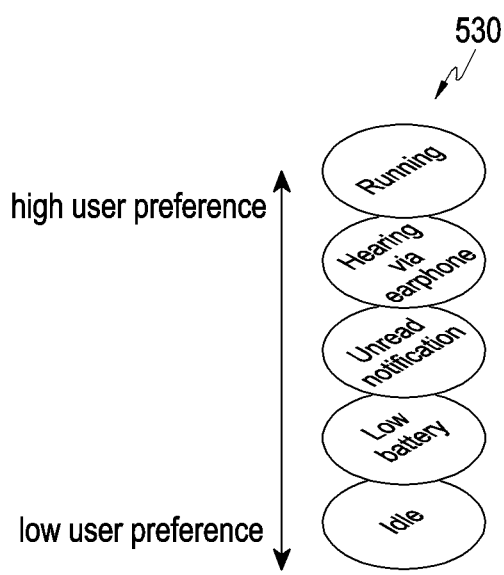
FIG. 5C is a view illustrating an example of identifying the priorities of a plurality of states based on order of user preference according to an embodiment of the disclosure.

According to an embodiment, as in the example of FIGS. 4A to 4C, the processor 220 may add a new state to the state list when entering the new state according to the state enter condition or delete an exited state from the state list when the existing state is exited according to the state exit condition, thereby updating the state list in real-time FIG. 5A is a view illustrating an example of identifying the priorities of a plurality of states based on chronological according to an embodiment of the disclosure. FIG. 5B is a view illustrating an example of identifying the priorities of a plurality of states based on order of importance according to an embodiment of the disclosure. FIG. 5C is a view illustrating an example of identifying the priorities of a plurality of states based on order of user preference according to an embodiment of the disclosure.

Referring to FIG. 5A, according to an embodiment, the processor 220 may identify (determine or confirm) the priority 510 of each of the plurality of states in order of occurrence from oldest to latest, according to chronological order. For example, the processor 220 may identify the priority of the idle state which has occurred longest before, as the lowest priority and identify the priority of the unread notification state, which has occurred most recently, as the highest priority.

Referring to FIG. 5B, according to an embodiment, the processor 220 may identify (determine or confirm) the priority 520 of each of the plurality of states in order from lowest importance to highest importance according to the order of importance preset by the user or manufacturer. For example, the importance may be set to be higher for essential functions (or operations) or emergency functions (or operations) among the functions or operations of the electronic device 201. The processor 220 may identify the priority of the idle state which has the lowest importance, as the lowest priority and identify the priority of the low battery state, which has the highest importance, as the highest priority.

Referring to FIG. 5C, according to an embodiment, the processor 220 may identify (determine or confirm) the priority 530 of each of the plurality of states in order from lowest user preference to highest user preference according to the order of user preference. For example, the processor 220 may identify the priority of the idle state which has the lowest user preference, as the lowest priority and identify the priority of the running state, which has the highest user preference, as the highest priority.

According to an embodiment, the processor 220 may also identify the priorities of the plurality of states further based on other various priority references (e.g., the level value of each state) than the examples in FIGS. 5A to 5C. For example, the processor 220 may identify the priority of each of the plurality of states based on time, importance, or user preference and then change the identified priority of each of the plurality of states based on the degree of the level value of each state (e.g., whether the level value is 1, 2, or another value).

According to an embodiment, the processor 220 may identify the priority based on each of time, importance, user preference, or level value of each state as in the above-described example and may also identify the priority based on a combination of time, importance, user preference, and level value of each state.

According to an embodiment, the processor 220 may identify the priorities of the plurality of states based on each of time, importance, user preference, and/or level value of each state or a combination of some conditions of time, importance, user preference, and level value of each state and, if there is a merged state in which some of the plurality of states have been merged, the processor 220 may then change the priorities of the plurality of states based on the presence of the merged state.

Figure 6:
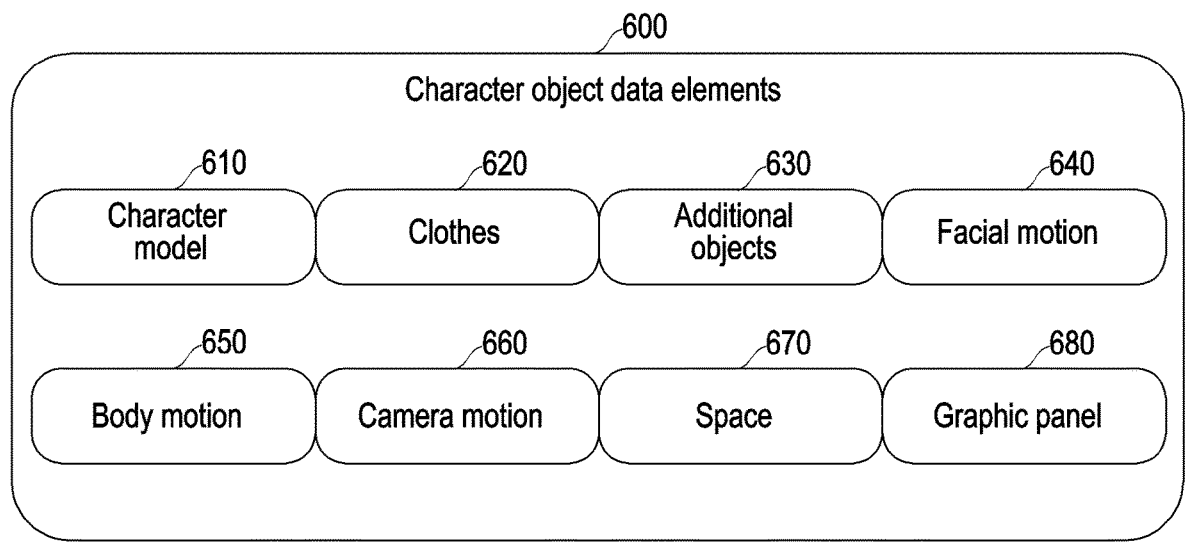
FIG. 6 is a view illustrating an example of a character object data element for rendering a character object according to an embodiment of the disclosure.

FIG. 6 is a view illustrating an example of a character object data element for rendering a character object according to an embodiment of the disclosure.

Referring to FIG. 6, according to an embodiment, the processor 220 may obtain character object data elements 600 for configuring (or rendering or displaying) the character object of each of the plurality of states from the memory 240 or through communication with an external electronic device. For example, the character object data elements 600 may include data elements for rendering a 2D graphic image and/or 3D animation including an avatar, an emoji, or an emoticon.

According to an embodiment, the character object data elements 600 may include a character model 610, a clothes 620, an additional objects 630, a facial motion 640, a body motion 650, a camera motion 660, a space 670, and/or a graphic panel 680 and may add other data elements for representing other character objects or omit some elements.

Table 2 below shows data elements constituting the character object according to an embodiment.

TABLE 2

| Data element | Description |
|---|---|
| character model | a character model created by the user on the electronic device or previously stored hair shape, hair color, moustache shape, moustache color, face shape, skin color, eye shape, eye color, eyebrow shape, eyebrow color, shape and color applied over the skin (makeup, tattoo), eyelash shape, eyelash color, lips shape, lips color, nose shape, ear shape, leg shape (including prosthetic leg), hand shape (including prosthetic arm) |
| clothes | clothes worn by the character clothes set by the user clothes that match the state: yoga clothes, training clothes, sneakers, raincoat, swimsuit, traditional costume |
| additional objects | additional objects attached to the body of the character model or displayed together in the 3D space where the character model exists. electronic device type: mobile phone, AR glasses, audio output device (Buds, speaker, headset), health aid (blood pressure monitor, scale), input device (keyboard, joystick), etc. prop Type: exercise equipment (yoga mat, ball, dumbbell), umbrella, car, etc. |
| facial motion | preset for frame-by-frame motion values in the face blend shape |
| body motion | preset for motion value for each frame of bone |
| camera motion | preset for frame-by-frame motion values for the position/angle of the camera shooting the character model |
| space | 3D space (empty space, stage, playground, room, street, etc.) |
| graphic panel | graphical element expressed in 2D that may be placed in the background or foreground |

Referring to Table 2 above, according to an embodiment, the data elements constituting the character object may include the character model, clothes, additional objects, face motion, body motion, camera motion, space, and/or graphic panel and it may further include other data elements. For example, the character model may be a data element corresponding to a character model created by the user on the electronic device or previously stored and may be data capable of displaying a 2D and/or 3D character model. For example, the character model data elements may include hair shape, hair color, moustache shape, moustache color, face shape, skin color, eye shape, eye color, eyebrow shape, eyebrow color, shape and color applied over the skin (makeup, tattoo), eyelash shape, eyelash color, lips shape, lips color, nose shape, ear shape, leg shape (including prosthetic leg), and/or hand shape (including prosthetic arm) data For example, the clothes may be a data element corresponding to the clothes that may be worn by the character model and may include data that may display designated clothes to fit for a context (e.g., the identified user state) or set by the user. For example, the additional objects element may include data corresponding to a 3D object that is attached to (or inserted to or carried on) the body of the character model or displayed together in the 3D space where the character model is present. For example, the additional objects may be data that may display a mobile phone, AR glasses, audio output device (earphone, speaker, or headset), health aid (blood pressure meter or scale), and/or input device (keyboard or joystick) that may be carried or possessed by the character model. For example, the face motion is a data element that may represent the motion of the face of the character model and may include preset data for the motion value for each frame in the face blend shape, and the face motion preset data may include frown face motion data, smiling face motion data, and/or eating face motion data. For example, the body motion is a data element that may represent the body motion of the character model and may include preset data for the motion value for each frame of the bone. For example, the body motion preset data may include data, such as walking motion data, running motion data, open umbrella motion data, dancing motion data, and/or object lifting motion data. For example, the space is a data element capable of representing a 3D space and may include data corresponding to various spaces, such as an empty space, a stage, a playground, a room, and/or a street. For example, the graphic panel may include data corresponding to a 2D graphic that may be displayed in the background or foreground of the character model.

Figure 7:
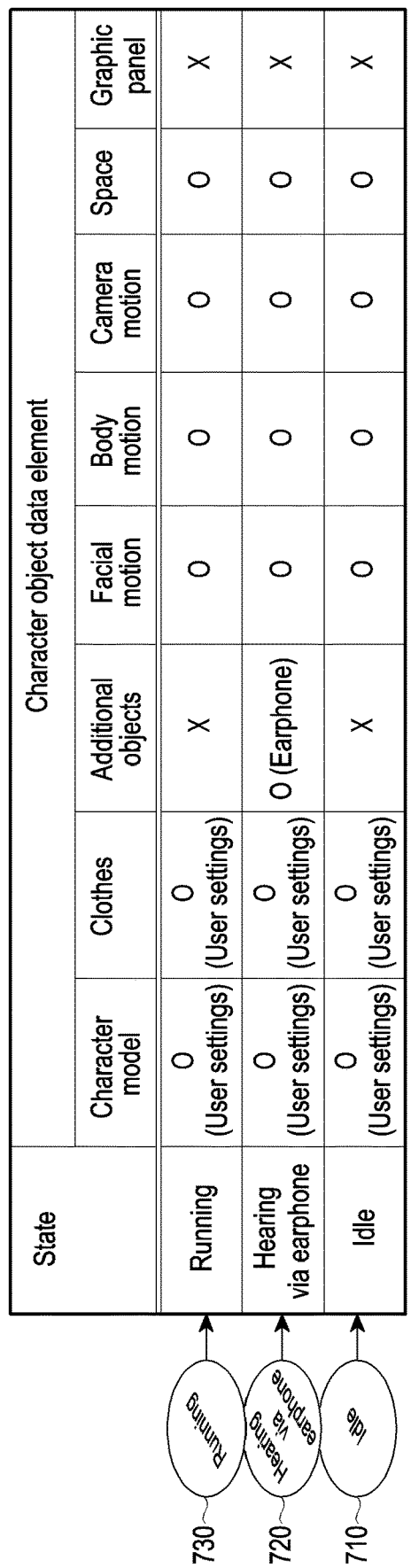
FIG. 7 is a view illustrating an example of a character object corresponding to each of a plurality of states and a data element of the character object according to an embodiment of the disclosure.

FIG. 7 is a view illustrating an example of a character object corresponding to each of a plurality of states and a data element of the character object according to an embodiment of the disclosure.

Referring to FIG. 7, according to an embodiment, when the plurality of states include an idle state 710, a hearing via earphone state 720, and a running state 730, the processor 220 may obtain (or identify) a character object and character object data elements corresponding to each state.

For example, the character object data elements of the idle state 710 may include character model data, clothes data, face motion data, body motion data, camera motion data, and space data. The processor 220 may display (render), on the display 260, a 3D animation character object that may represent the idle state 710 using the character model data, clothes data, face motion data, body motion data, camera motion data, and space data of the idle state 710. For example, the character object data elements of the hearing via earphone state 720 may include character model data, clothes data, additional objects data, face motion data, body motion data, camera motion data, and space data. The processor 220 may render, on the display 260, the 3D animation character object that may represent the hearing via earphone state 720 using the character model data, clothes data, additional objects data, face motion data, body motion data, camera motion data, and space data of the hearing via earphone state 720. For example, the character object data elements of the running state 730 may include character model data, clothes data, face motion data, body motion data, camera motion data, and space data. The processor 220 may render, on the display 260, a 3D animation character object that may represent the running state 730 using the character model data, clothes data, face motion data, body motion data, camera motion data, and space data of the running state 730.

Figure 8B:
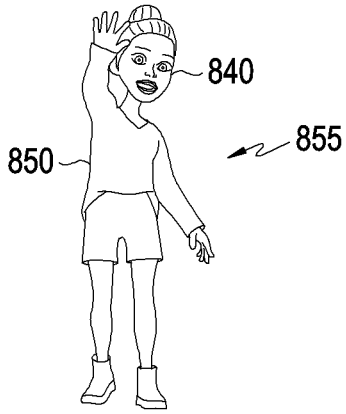
FIG. 8B is a view illustrating an example of a rendered image of face motion data, body motion data, camera motion data, a space data, and graphic panel data according to an embodiment of the disclosure.
Figure 8B:
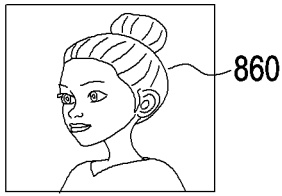
Figure 8B:
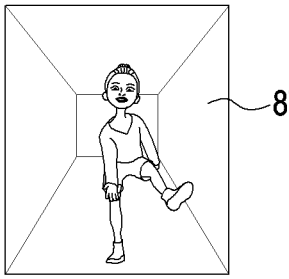
Figure 8B:
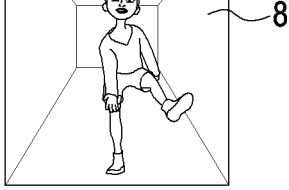

FIG. 8A is a view illustrating an example of a rendered image of character model data, clothes data, and additional object data according to an embodiment of the disclosure. FIG. 8B is a view illustrating an example of a rendered image of face motion data, body motion data, camera motion data, a space data, and graphic panel data according to an embodiment of the disclosure.

Referring to FIG. 8A, according to an embodiment, the processor 220 may perform rendering based on hair shape, hair color, moustache shape, moustache color, face shape, skin color, eye shape, eye color, eyebrow shape, eyebrow color, shape and color applied over the skin (makeup, tattoo), eyelash shape, eyelash color, lips shape, lips color, nose shape, ear shape, leg shape, and/or hand shape corresponding to character model data previously designated or set by the user and display a character model image 810. According to an embodiment, the processor 220 may perform rendering based on the clothes data and display a character model image 820 wearing clothes (e.g., set clothes (e.g., a raincoat)). According to an embodiment, the processor 220 may perform rendering based on the additional objects data and display a character model image 831 or 832 which has or wears an additional object (e.g., a set additional object (e.g., an earphone or glasses or other objects).

Referring to FIG. 8B, according to an embodiment, the processor 220 may perform rendering based on the face motion data and body motion data and display a character model image 855 that moves in a set face motion 840 and a set body motion 850. According to an embodiment, the processor 220 may perform rendering based on the camera motion data and display a character model image 860 that reflects the camera gaze. According to an embodiment, the processor 220 may perform rendering based on the space data and display a character model image 870 that is present in a set 3D space. According to an embodiment, the processor 220 may perform rendering based on the graphic panel data and display a character model image 880 in which a graphic panel is displayed in the foreground or background.

According to an embodiment, the processor 220 may perform rendering based on the character model data, clothes data, additional objects data, face motion data, body motion data, camera motion data, space data, and graphic panel data and display other images, in addition to the above-described examples.

Figure 9:
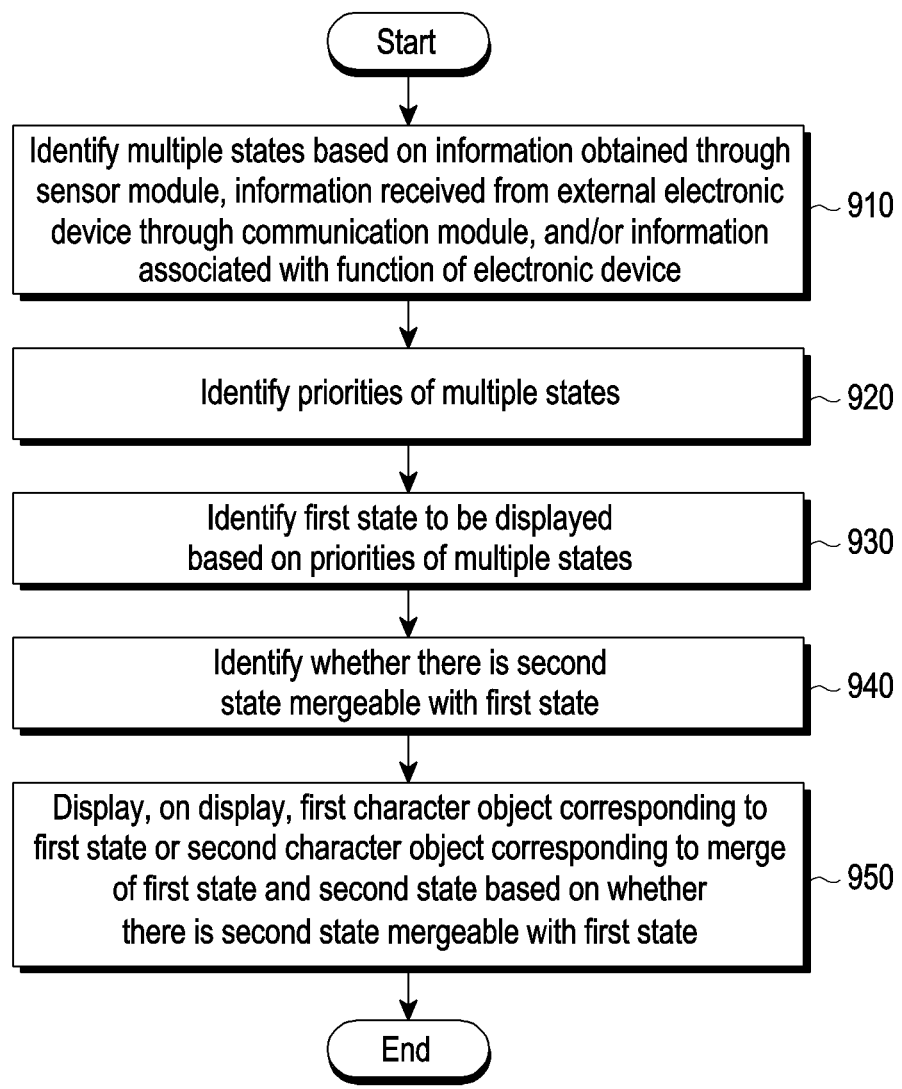
FIG. 9 is a flowchart illustrating a character object display operation based on the priorities of a plurality of stats in an electronic device according to an embodiment of the disclosure.

FIG. 9 is a flowchart illustrating a character object display operation based on the priorities of a plurality of stats in an electronic device according to an embodiment of the disclosure.

Referring to FIG. 9, according to an embodiment, a processor (e.g., the processor 120 of FIG. 1 or the processor 220 of FIG. 2) of an electronic device (e.g., the electronic device 101 of FIG. 1 or the electronic device 201 of FIG. 2) may perform at least one of operations 910 to 950.

In operation 910, according to an embodiment, the processor 220 may identify (or determine or confirm) a plurality of states of the electronic device 201 based on the information associated with the function of the electronic device 201, information obtained through the sensor module 212, and/or information received from the external electronic device through the communication module 214. For example, the information associated with the function of the electronic device 201 may include schedule information, notification information, information related to execution of application, remaining battery level, and/or charging-related information, obtained by a scheduling function, a notification function, a function of executing an application (e.g., a music play application, video play application, web browser application, message transmission/reception application, and/or call application), and/or power management function and may further include information associated with any function that is executed by the processor 220. For example, the information obtained through the sensor module 212 and/or the information received from the external electronic device through the communication module 214 may include biometric sensing information, environment sensing information, and/or information associated with performing the function of the external electronic device and may further include other information that may be obtained through the sensor module 212 or received from the external electronic device through the communication module 214. For example, the plurality of states may include the state of the electronic device, the state of the user of the electronic device, the state of the external electronic device connected with or communicating with the electronic device, the ambient environment state of the electronic device, and/or other states identifiable by the processor 220. According to an embodiment, the processor 220 may identify a plurality of states which occur in order from a designated reference time of the electronic device 201 (e.g., from when powered on, when the standby state is exited, or a time according to another reference) in chronological order, generate and/or store a state list and may update the state list in real-time by adding a new state to the state list when entering the new state according to the state enter condition or deleting an exited state from the state list when an existing state is exited according to the state exit condition.

In operation 920, according to an embodiment, the processor 220 may identify (or determine) the priorities of the plurality of states (e.g., the plurality of states on the state list). For example, the processor 220 may identify the priority of each of the plurality of states based on a designated priority reference. For example, the designated priority reference may include at least one of chronological order, importance, user preference, and/or level value of each state. For example, the processor 220 may determine the priority of each of the plurality of states in order from latest to oldest according to chronological order, determine the priority of each of the plurality of states in order from most importance to least importance according to order of importance, determine the priority of each of the plurality of states in order from highest user preference to lowest user preference, or determine the priority of each of the plurality of states in order of highest state level value to lowest state level value. For example, the processor 220 may also determine the priority of each of the plurality of states based on other priority references than the chronological order, importance, user preference, or level value of each state.

In operation 930, according to an embodiment, the processor 220 may identify a first state to be displayed on the display 260 based on the priorities of the plurality of states. For example, the processor 220 may identify the highest-priority state among the plurality of states, according to a designated priority reference, as the first state to be displayed on the display 260.

In operation 940, according to an embodiment, the processor 220 may identify whether there is a second state (e.g., at least one other state mergeable with the first state) mergeable with the first state. According to an embodiment, the processor 220 may identify the character object of each of the plurality of states (e.g., the plurality of states on the state list) and identify whether there is the second state (e.g., at least one other state mergeable with the first state) mergeable with the first state based on the character object of each of the plurality of identified states. For example, the character object may include an avatar, an emoji, or an emoticon and may include data elements for rendering a 2D graphic image and/or a 3D animation. For example, the processor 220 may identify the character object corresponding to each of the plurality of states based on the data elements corresponding to the plurality of stored character objects, generate the character object corresponding to each of the plurality of states, or receive the character object corresponding to each of the plurality of states from the external electronic device.

According to an embodiment, the processor 220 may identify whether there is the second state (e.g., the character object of the second state) mergeable with the first state (or the character object of the first state) based on the designated mergeable condition. According to an embodiment, the processor 220 may identify whether there is at least one other state (e.g., a second state) mergeable with the first state based on a designated mergeable condition. For example, the mergeable condition may include when the second state includes a data element not overlapping the data elements of the character object of the first state, when the second state includes a data element replaceable (or changeable) among the data elements of the character object of the first state, or when the second state includes a data element not colliding (or not conflicting or compatible) with the data elements of the character object of the first state. For example, when the second state includes a data element not overlapping the data elements of the character object of the first state may include when the second state includes second additional object data not overlapping first additional object data of the character object of the first state, when the second state includes additional object data addable to the data elements of the character object of the first state, or when the second state includes graphic panel data addable to the data elements of the character object of the first state. For example, when the second state includes a data element replaceable among the data elements of the character object of the first state may include when at least some of the object data elements of the first state are replaceable with object data elements of the second state or when the second state may include other elements that may change (or replace) some elements (or a plurality of elements) among the object data elements of the first state. For example, if the clothes element of the object data elements of the first state (everyday state) is everyday clothes, and the second state (bedtime state) includes pajamas, into which the everyday clothes are changeable, as the clothes element, the bedtime state may be identified as mergeable with the everyday state. As another example, if the space element of the character object of the object data element of the first state (rest state) is a first space element (e.g., a space indicating the rest state), and the second state (state of having traveled abroad) includes a second space element (e.g., a space indicating the foreign country) into which the first space is changeable, as the space element of the character object, the rest state may be identified as mergeable with the state of having traveled abroad. For example, when the second state includes a data element not colliding (or not conflicting or compatible) with the data elements of the character object of the first state may include when the data element of the character object of the first state includes a face motion and a body motion, and the data element of the character object of the second state includes an additional object, not conflicting with the face motion and body motion, (e.g., an earphone, BT speaker, accessory, glasses, and/or at least one other body (face or body)-wearable or carriable object) or when the data element of the first state (face motion and body motion) and the data element of the second state (additional object) are mergeable.

In operation 950, according to an embodiment, the processor 220 may display the first character object corresponding to the first state or the second character object corresponding to the merge of the first state and the second state, based on whether there is the second state mergeable with the first state. For example, if the first state is the running state, and there is no second state mergeable with the first state, the processor 220 may render a running character object on the display 260 based on the data elements of the character object corresponding to the running state. For example, if the first state is the running state, and there is the second state (e.g., hearing via earphone state) mergeable with the first state, the processor 220 may merge the data elements of the first character object of the running state and the data elements of the second character object corresponding to the hearing via earphone state and render (display), on the display 260, a character object that is running while wearing an earphone, based on the merged data elements. For example, if there is no second state mergeable with the first state, the processor 220 may display the first character object corresponding to the first state and then further display at least one next-priority character object in order of priority. For example, if there is the second state mergeable with the first state, the processor 220 may display the second character object corresponding to the merge of the first state and the second state and then further display at least one next-priority character object of the merged state in order of priority.

Although such an example has been described in connection with FIG. 9 that operation 940 (operation of identifying the second state mergeable with the first state) is performed after operation 920 (operation of identifying the priorities of the plurality of states) and operation 930 (operation of identifying the first state according to priority) according to an embodiment, it is also possible according to another embodiment to identify (or determine) whether there are mergeable states among the plurality of states before identifying the priorities of the plurality of states to identify whether there are mergeable states, identify the priorities of the plurality of states based on the result of merging the mergeable states or whether there are mergeable states, and then identify and display the highest-priority first state.

As another embodiment, it is possible to, after identifying the priorities of the plurality of states, identify (or determine) whether there are mergeable states among the plurality of states to identify whether there are mergeable states and change the priorities of the plurality of identified states based on the result of merging the mergeable states or whether there are mergeable states.

According to various embodiments, a method performed by an electronic device for displaying a character object based on priorities of a plurality of states in the electronic device (e.g., the electronic device 101 of FIG. 1 or the electronic device 201 of FIG. 2) may comprise identifying the plurality of states based on at least one of information obtained through a sensor module of the electronic device (e.g., the sensor module 176 of FIG. 1 or the sensor module 212 of FIG. 2), information received from an external electronic device through a communication module of the electronic device (e.g., the communication module 190 of FIG. 1 or the communication module 214 of FIG. 2), or information associated with a function of the electronic device, identifying the priorities of the plurality of states, identifying a first state among the plurality of states based on the identified priorities, identifying whether there is a second state mergeable with the first state, and displaying a first character object corresponding to the first state or a third character object corresponding to a merge of the first state and the second state, based on whether there is the second state mergeable with the first state.

According to various embodiments, at least one of the first character object or the third character object may include a 3D animation.

According to various embodiments, the method may further comprise obtaining a state list including the plurality of states.

According to various embodiments, the method may further comprise adding a new state to the state list upon identifying entry into the new state based on a state enter condition and deleting an existing state from the state list upon identifying exit from the existing state based on a state exit condition.

According to various embodiments, the method may further comprise identifying the priorities of the plurality of states on the state list based on a designated priority reference.

According to various embodiments, the designated priority reference may include at least one of chronological order, importance, user preference, or a level value of each state.

According to various embodiments, the plurality of states may include at least one of a state of the electronic device, a state of the external electronic device, a user state, or an ambient environment state.

According to various embodiments, the method may further comprise obtaining a first character object data element for rendering the first character object corresponding to the first state and displaying the first character object using the obtained first character object data element.

According to various embodiments, the first character object data element may include at least one of a character model, clothing, an additional object, a face motion, a body motion, a camera motion, a space, or a graphic panel.

According to various embodiments, the method may further comprise obtaining a first character object data element for rendering the first character object corresponding to the first state and a second character object data element for rendering a second character object corresponding to the second state, merging at least part of the first character object data element and at least part of the second character object data element, and displaying the third character object corresponding to the merge.

Figure 10:
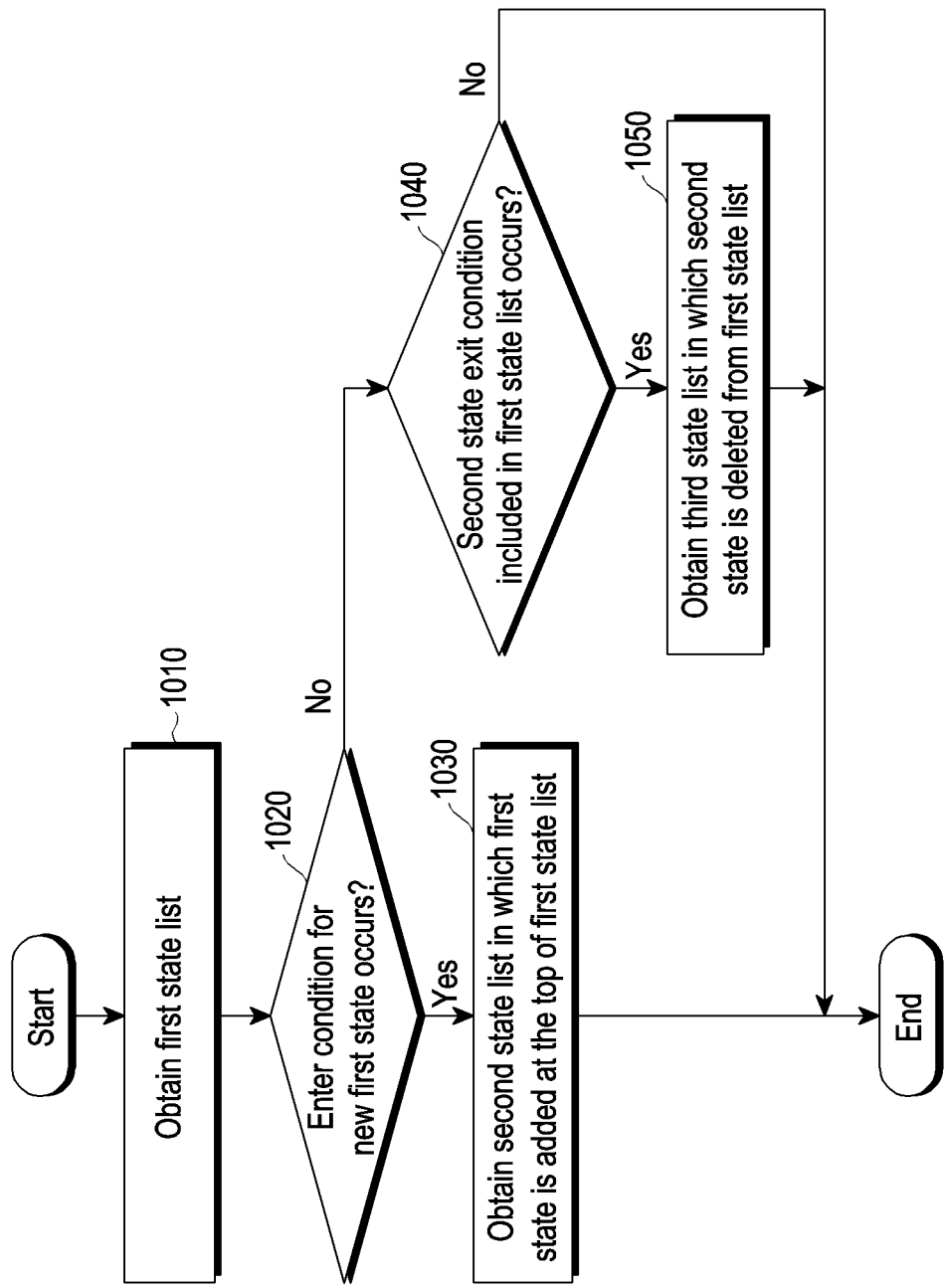
FIG. 10 is a flowchart illustrating an operation of obtaining a state list including a plurality of states in an electronic device according to an embodiment of the disclosure.

FIG. 10 is a flowchart illustrating an operation of obtaining a state list including a plurality of states in an electronic device according to an embodiment of the disclosure.

Referring to FIG. 10, according to an embodiment, a processor (e.g., the processor 120 of FIG. 1 or the processor 220 of FIG. 2) of an electronic device (e.g., the electronic device 101 of FIG. 1 or the electronic device 201 of FIG. 2) may perform at least one of operations 1010 to 1050.

In operation 1010, according to an embodiment, the processor 220 may obtain (generate, identify, or store) a first state list by identifying a plurality of states that occur in chronological order from a designated reference time (e.g., from when powered on, when the standby state is exited, or a time according to another reference).

In operation 1020, according to an embodiment, the processor 220 may identify (or confirm) whether an enter condition for a new first state is generated.

In operation 1030, according to an embodiment, the processor 220 may generate (identify and/or store) a second state list that adds the first state at the top of the first state list based on the generation of the enter condition for the new first state.

In operation 1040, according to an embodiment, the processor 220 may identify (or confirm) whether an exit condition for the second state included in the first state list is generated.

In operation 1050, according to an embodiment, the processor 220 may generate (identify and/or store) a third state list in which the second state is deleted from the first state list based on the generation of the exit condition for the second state.

Figure 11:
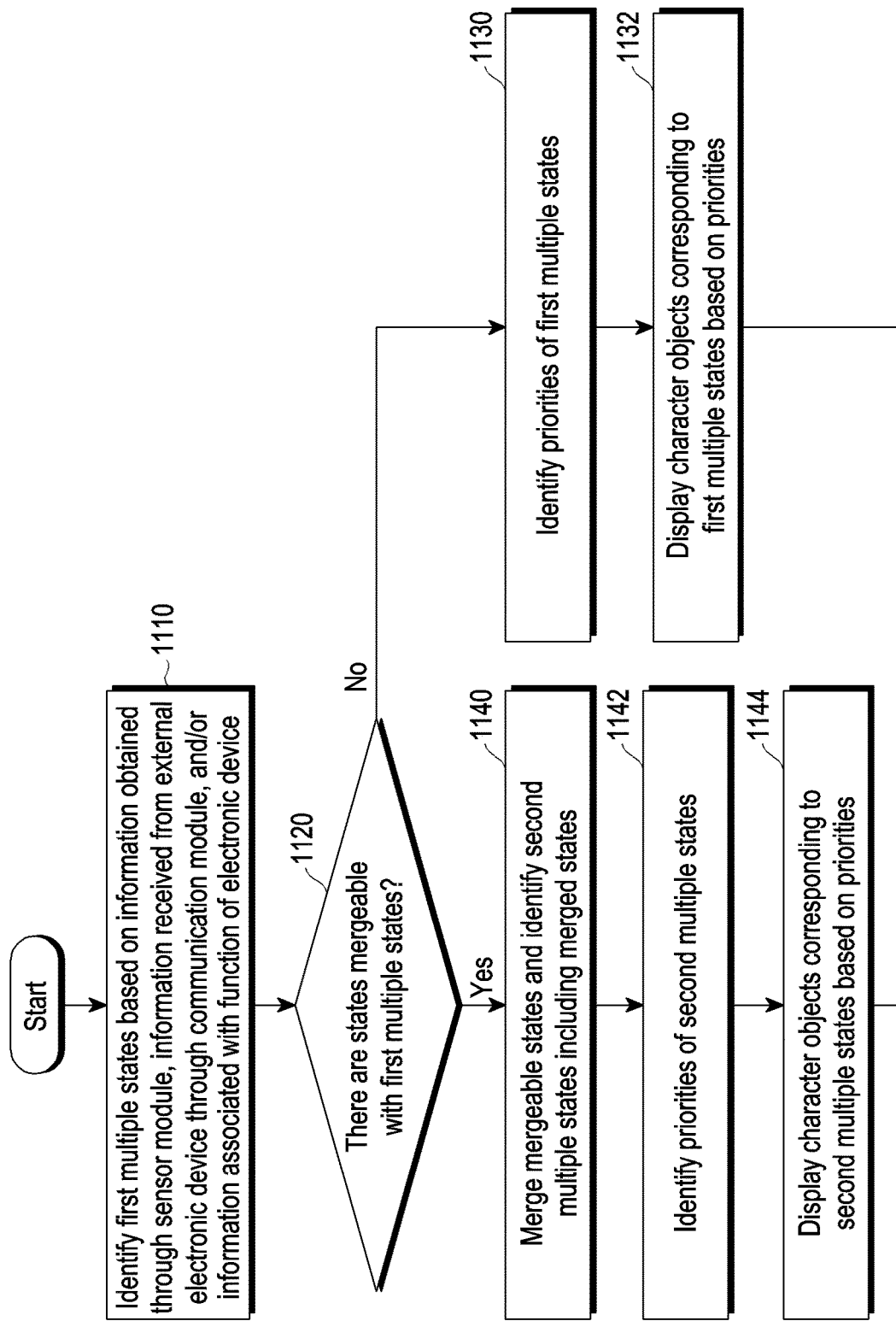
FIG. 11 is a flowchart illustrating a method for displaying a character object according to priority after merging mergeable states among a plurality of states in an electronic device according to an embodiment of the disclosure.

FIG. 11 is a flowchart illustrating a method for displaying a character object according to priority after merging mergeable states among a plurality of states in an electronic device according to an embodiment of the disclosure.

Referring to FIG. 11, according to an embodiment, a processor (e.g., the processor 120 of FIG. 1 or the processor 220 of FIG. 2) of an electronic device (e.g., the electronic device 101 of FIG. 1 or the electronic device 201 of FIG. 2) may perform at least one of operations 1110 to 1144.

In operation 1110, according to an embodiment, the processor 220 may identify (or determine or confirm) a first plurality of states of the electronic device 201 based on the information associated with the function of the electronic device 201, information obtained through the sensor module 212, and/or information received from the external electronic device through the communication module 214. For example, the information associated with the function of the electronic device 201 may include schedule information, notification information, information related to execution of application, remaining battery level, and/or charging-related information, obtained by a scheduling function, a notification function, a function of executing an application (e.g., a music play application, video play application, web browser application, message transmission/reception application, and/or call application), and/or power management function and may further include information associated with any function that is executed by the processor 220. For example, the information obtained through the sensor module 212 and/or the information received from the external electronic device through the communication module 214 may include biometric sensing information, environment sensing information, and/or information associated with performing the function of the external electronic device and may further include other information that may be obtained through the sensor module 212 and/or received through the communication module 214. For example, the plurality of states may include the state of the electronic device, the state of the user of the electronic device, the state of the external electronic device connected with or communicating with the electronic device, the ambient environment state of the electronic device, and/or other states identifiable by the processor 220. According to an embodiment, the processor 220 may identify the first plurality of states on the state list, which are generated in chronological from a designated reference time of the electronic device 201 (e.g., when powered on, when the standby state ends, or a time according to another reference) and currently maintained.

In operation 1120, according to an embodiment, the processor 220 may identify (or confirm) whether there are mergeable states among the first plurality of states. For example, the processor 220 may identify mergeable states among the first plurality of states based on the designated mergeable condition. For example, the designated mergeable condition may include when the second state includes a data element not overlapping the data elements of the character object of the first state, when the second state includes a data element replaceable (or changeable) among the data elements of the character object of the first state, or when the second state includes a data element not colliding (or not conflicting or compatible) with the data elements of the character object of the first state. For example, when the second state includes a data element not overlapping the data elements of the character object of the first state may include when the second state includes second additional object data not overlapping first additional object data of the character object of the first state, when the second state includes additional object data addable to the data elements of the character object of the first state, or when the second state includes graphic panel data addable to the data elements of the character object of the first state. For example, when the second state includes a data element replaceable among the data elements of the character object of the first state may include when at least some of the object data elements of the first state are replaceable with object data elements of the second state or when the second state may include other elements that may change (or replace) some elements (or a plurality of elements) among the object data elements of the first state. For example, if the clothes element of the object data elements of the first state (everyday state) is everyday clothes, and the second state (bedtime state) includes pajamas, into which the everyday clothes are changeable, as the clothes element, the bedtime state may be identified as mergeable with the everyday state. As another example, if the space element of the character object of the object data element of the first state (rest state) is a first space element (e.g., a space indicating the rest state), and the second state (state of having traveled abroad) includes a second space element (e.g., a space indicating the foreign country) into which the first space is changeable, as the space element of the character object, the rest state may be identified as mergeable with the state of having traveled abroad. For example, when the second state includes a data element not colliding (or not conflicting or compatible) with the data elements of the character object of the first state may include when the data element of the character object of the first state includes a face motion and a body motion, and the data element of the character object of the second state includes an additional object, not conflicting with the face motion and body motion, (e.g., an earphone, BT speaker, accessory, glasses, and/or at least one other body (face or body)-wearable or carriable object) or when the data element of the first state (face motion and body motion) and the data element of the second state (additional object) are mergeable.

In operation 1130, according to an embodiment, if there are no mergeable states among the first plurality of states, the processor 220 may identify the priorities of the first plurality of states. For example, the processor 220 may identify the priority corresponding to each of the first plurality of states based on a designated priority reference. For example, the designated priority reference may include at least one of chronological order, importance, user preference, and/or level value of each state. For example, the processor 220 may determine the priority of each of the first plurality of states in order from latest to oldest according to chronological order, determine the priority of each of the first plurality of states in order from most importance to least importance according to order of importance, determine the priority of each of the first plurality of states in order from highest user preference to lowest user preference, or determine the priority of each of the first plurality of states in order of highest state level value to lowest state level value. For example, the processor 220 may also determine the priority of each of the first plurality of states based on other priority references than the chronological order, importance, user preference, or level value of each state.

In operation 1132, according to an embodiment, the processor 220 may display character objects corresponding to the first plurality of states based on the priorities of the first plurality of states. For example, the processor 220 may display the first character object corresponding to the highest-priority first state among the first plurality of states or display the character objects individually corresponding to the first plurality of states in order from highest priority to lowest priority according to order of priority of the first plurality of states.

In operation 1140, according to an embodiment, if there are mergeable states among the first plurality of states, the processor 220 may merge the mergeable states and identify a second plurality of states including the merged states. For example, if the first plurality of states may include a first state, a second state, and a third state, and the second state and the third state are merged, the second plurality of states may include the first state and the merged second and third states.

In operation 1142, according to an embodiment, the processor 220 may identify the priorities of the second plurality of states. For example, the processor 220 may allow the merged second and third states, among the second plurality of states, to have the highest priority while allowing the remaining states to have priorities according to the designated priority reference, thereby identifying the priority corresponding to each of the second plurality of states.

In operation 1144, according to an embodiment, the processor 220 may display character objects corresponding to the second plurality of states based on the priorities of the second plurality of states. For example, the processor 220 may display the character object corresponding to the merged states, which have the highest priority, based on the priorities of the second plurality of states or display the character object corresponding to the merged states with the highest priority according to the priorities of the second plurality of states and then display the character objects of the other states in order from the next highest priority to lowest priority.

Figure 12:
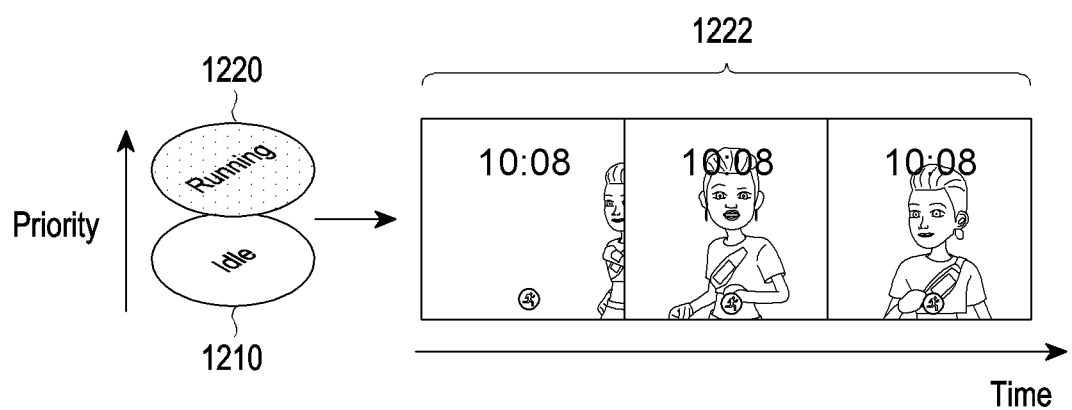
FIG. 12 is a view illustrating an example of displaying a character object corresponding to a highest-priority state in an electronic device according to an embodiment of the disclosure.

FIG. 12 is a view illustrating an example of displaying a character object corresponding to a highest-priority state in an electronic device according to an embodiment of the disclosure.

Referring to FIG. 12, according to an embodiment, if the plurality of states include an idle state 1210 and a running state 1220, and the running state 1220 has the highest priority, the processor 220 may display, on the display 260, a running character object 1222 that corresponds to the highest-priority running state 1220. For example, the running character object 1222 may be displayed as a 3D animation in which the character model runs.

Figure 13:
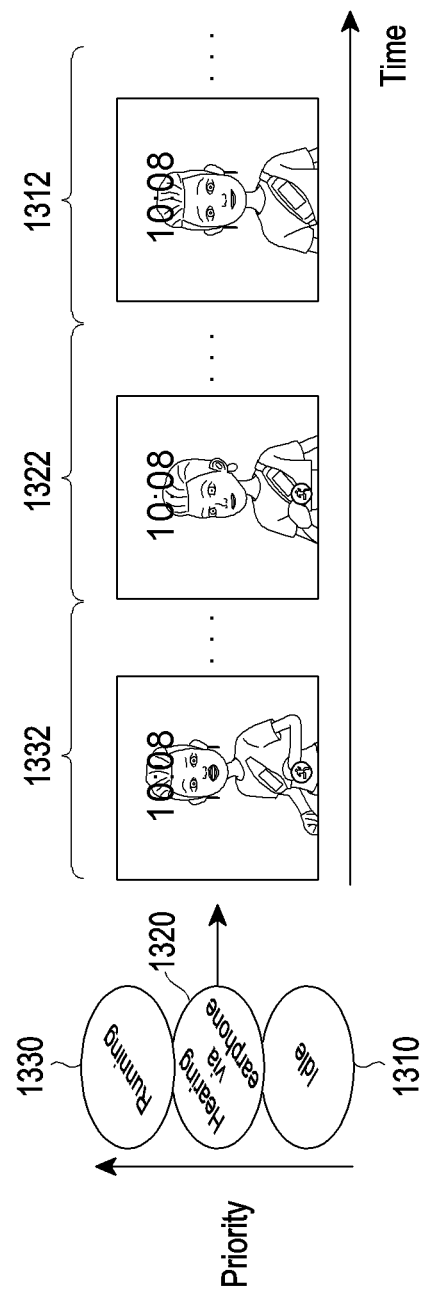
FIG. 13 is a view illustrating an example of displaying character objects corresponding to a plurality of states, in order of priority, in an electronic device according to an embodiment of the disclosure.

FIG. 13 is a view illustrating an example of displaying character objects corresponding to a plurality of states, in order of priority, in an electronic device according to an embodiment of the disclosure.

Referring to FIG. 13, according to an embodiment, if the plurality of states include an idle state 1310, a hearing via earphone state 1320, and a running state 1330, and the order of priority is the order of the running state 1330, hearing via earphone state 1320, and idle state 1310, the processor 220 may display a running character object 1332, an earphone-worn character object 1322, and an idle-state character object 1312, in order, on the display 260. For example, the running character object 1332, the earphone-worn character object 1332, and the idle-state character object 1312 each may be displayed in 3D animation.

Figure 14:
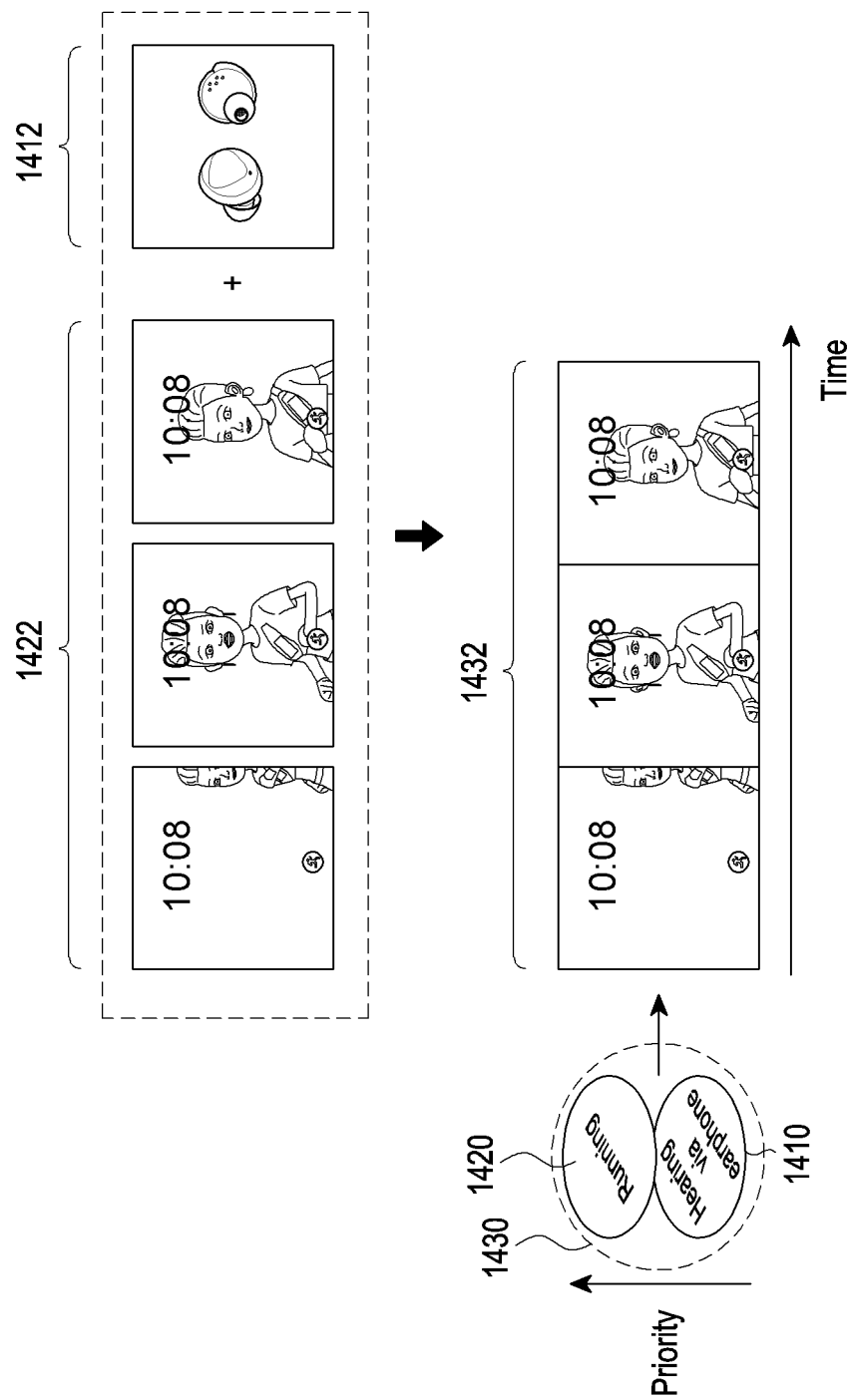
FIG. 14 is a view illustrating an example of displaying a character object corresponding to a merged state in an electronic device according to an embodiment of the disclosure.

FIG. 14 is a view illustrating an example of displaying a character object corresponding to a merged state in an electronic device according to an embodiment of the disclosure.

Referring to FIG. 14, according to an embodiment, if the plurality of states include a hearing via earphone state 1410 and a running state 1420, and the hearing via earphone state 1410 and the running state 1420 are mergeable, the processor 220 may merge the hearing via earphone state 1410 and the running state 1420 and identify a merged state 1430. According to an embodiment, when the hearing via earphone state 1410 and the running state 1420 are merged, the processor 220 may merge the character object 1412 corresponding to the earphone corresponding to the hearing via earphone state 1410 with the running character object 1422 corresponding to the running state 1420 and obtain the merged character object 1432. For example, the merged character object 1432 may be the character object 1432 that is running while wearing the earphone. According to an embodiment, the processor 220 may display, on the display 260, the character object 1432 that is running while wearing the earphone. For example, the character object 1432 that is running in the earphone-worn state may be displayed as a 3D animation.

Figure 15:
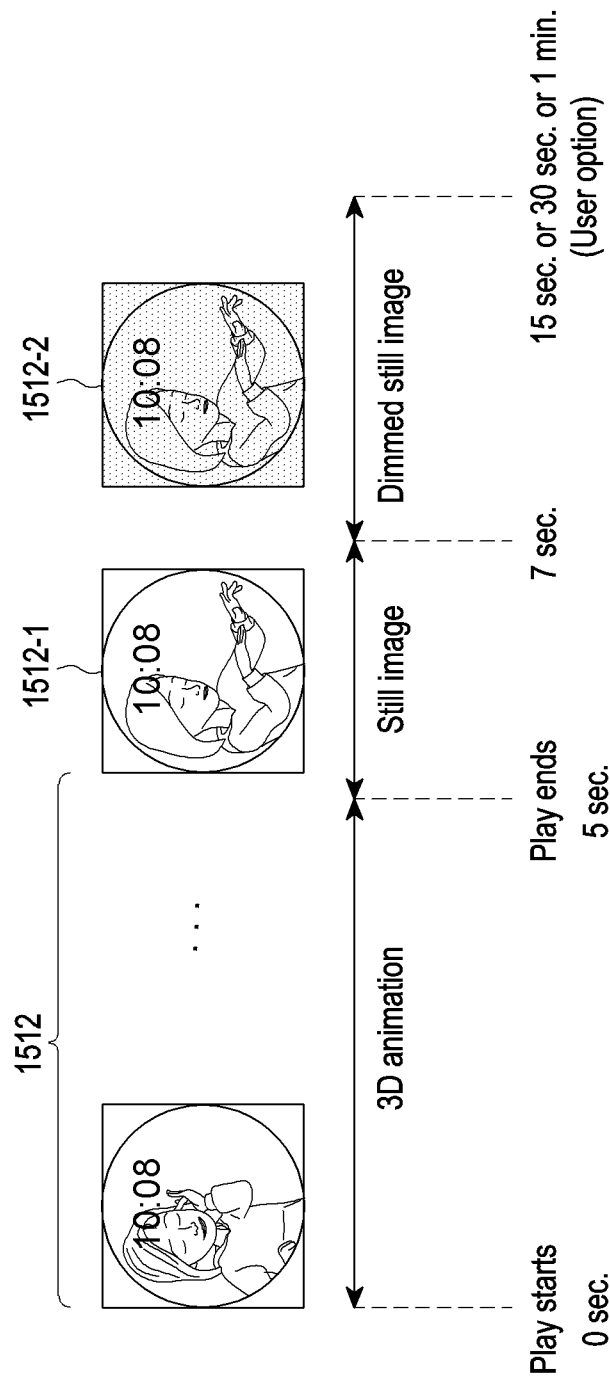
FIG. 15 is a view illustrating an example of a character object display scheme in an electronic device according to an embodiment of the disclosure.

FIG. 15 is a view illustrating an example of a character object display scheme in an electronic device according to an embodiment of the disclosure.

Referring to FIG. 15, according to an embodiment, upon displaying a character object 1512 in a priority-based state among a plurality of states, the processor 220 may play a character object 1512 as a 3D animation for a designated first time (e.g., about five seconds). According to an embodiment, after the play of the 3D animation is terminated, the processor 220 may display a still image 1512-1 corresponding to the character object 1512 for a designated second time (e.g., two seconds). According to an embodiment, after the display of the still image 1512-1 is terminated, the processor 220 may display a dimmed still image 1512-2 for a designated third time (e.g., 15 seconds, 30 seconds, or one minute) or a user option.

Figure 16:
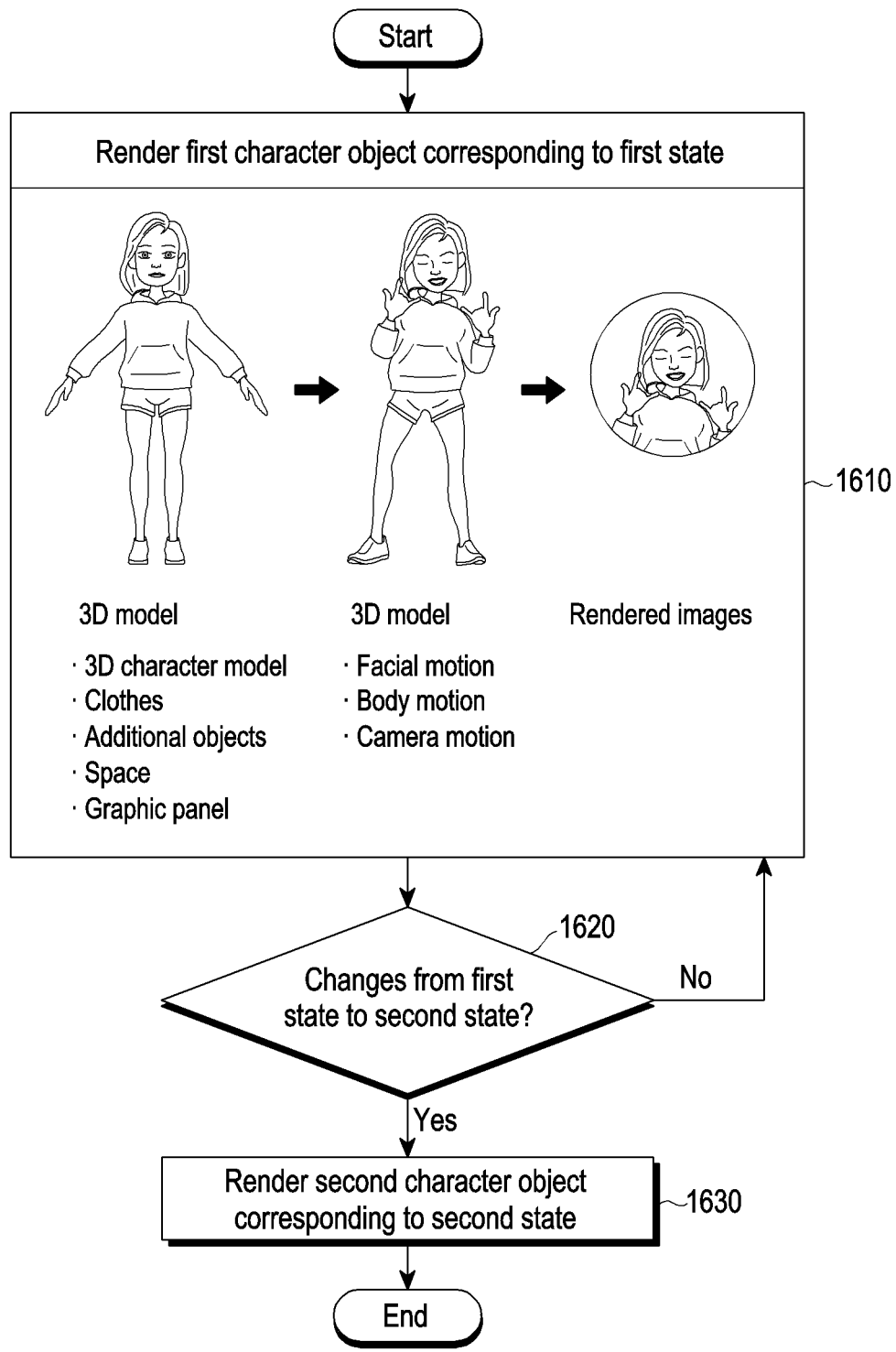
FIG. 16 is a flowchart illustrating an operation of changing a character object based on a change in priority in an electronic device according to an embodiment of the disclosure.

FIG. 16 is a flowchart illustrating an operation of changing a character object based on a change in priority in an electronic device according to an embodiment of the disclosure.

Referring to FIG. 16, according to an embodiment, a processor (e.g., the processor 120 of FIG. 1 or the processor 220 of FIG. 2) of an electronic device (e.g., the electronic device 101 of FIG. 1 or the electronic device 201 of FIG. 2) may perform at least one of operations 1610 to 1630.

In operation 1610, according to an embodiment, the processor 220 may render a character object corresponding to a first state. For example, the processor 220 may render a first character object corresponding to the highest-priority first state based on the priorities of the plurality of states. For example, the processor 220 may perform rendering on the first character object based on data elements constituting the character object (e.g., character model, clothes, additional objects, face motion, body motion, camera motion, space, and/or graphic panel) and display the rendered image on the display 260.

In operation 1620, according to an embodiment, the processor 220 may identify whether the highest-priority state is changed from the first state to a second state based on a change in priority. According to an embodiment, if the highest-priority state is maintained as the first state, the processor 220 may maintain the display of the first character object corresponding to the highest-priority first state.

In operation 1630, according to an embodiment, the processor 220 may render a second character object corresponding to the second state based on the change of the highest-priority state from the first state to the second state.

Figure 17:
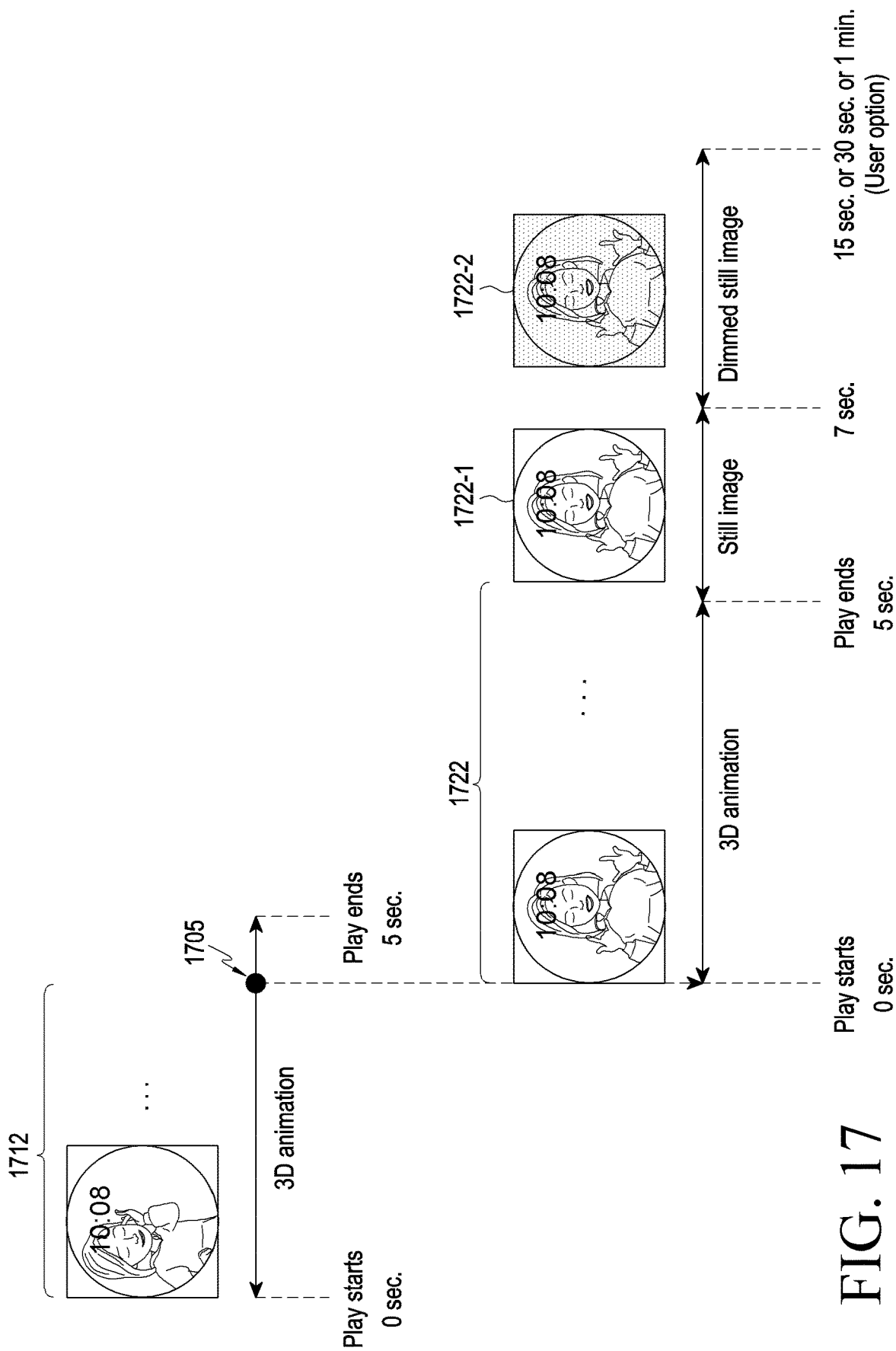
FIG. 17 is a view illustrating an example of changing a first character object into a second character object and displaying it in an electronic device according to an embodiment of the disclosure.

FIG. 17 is a view illustrating an example of changing a first character object into a second character object and displaying it in an electronic device according to an embodiment of the disclosure.

Referring to FIG. 17, according to an embodiment, the processor 220 may play a first character object 1712 corresponding to a priority-based highest-priority first state among a plurality of states, as a 3D animation. According to an embodiment, the processor 220 may identify a second character object 1722 that is to be newly played based on an event occurrence 1705 while the 3D animation of the first character object 1712 is played. For example, the event may include a change of highest priority, entry into a new state, or detection of a user input (e.g., detection of a tap to the display 260). According to an embodiment, the processor 220 may start to play the second character object 1722, as a 3D animation, from the time of event occurrence. According to an embodiment, if no other event occurs when the second character object 1722 is rendered, the processor 220 may play the second character object 1722, as a 3D animation, for a designated first time (about five seconds) and then display a still image 1722-1 corresponding to the second character object 1722 for a designated second time (e.g., about two seconds) and display a dimmed still image 1722-2 for a designated three time (e.g., 15 seconds, 30 seconds, or one minute) or a user option after displaying the still image 1722-1.

Figure 18:
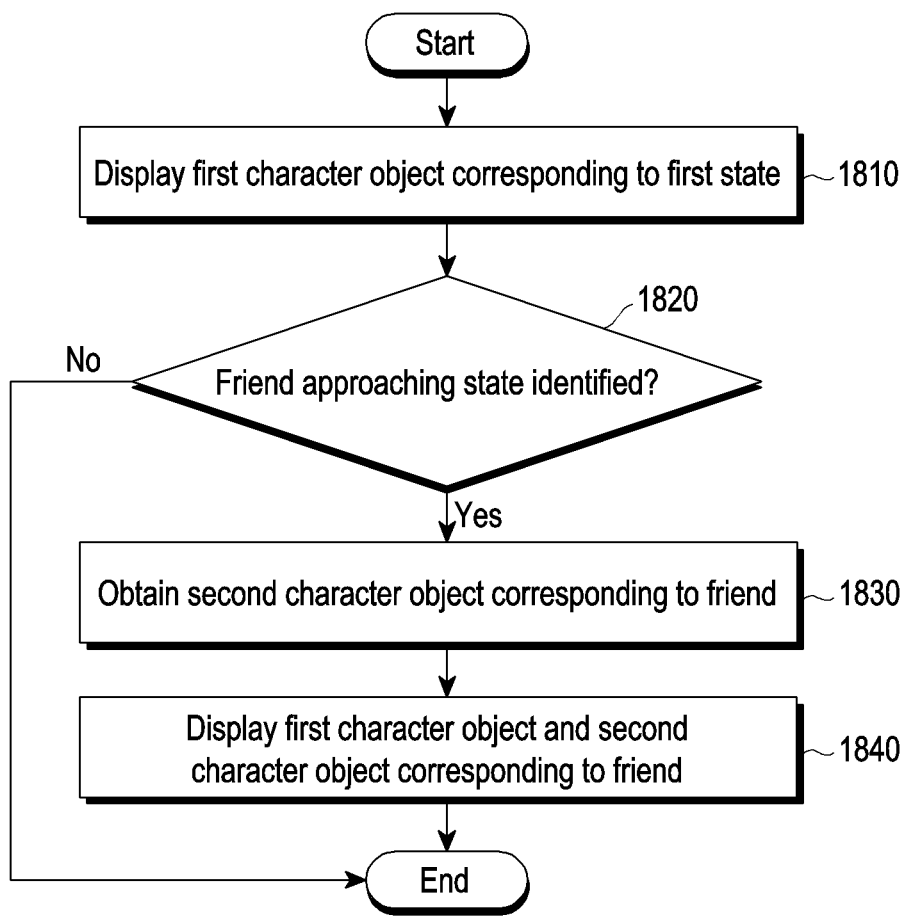
FIG. 18 is a flowchart illustrating an operation of displaying a first character object and a second character object corresponding to a friend, upon identifying a fried approaching state, in an electronic device according to an embodiment of the disclosure.

FIG. 18 is a flowchart illustrating an operation of identifying a friend approaching state and displaying a second character object corresponding to the identified fried in an electronic device according to an embodiment of the disclosure.

Referring to FIG. 18, according to an embodiment, a processor (e.g., the processor 120 of FIG. 1 or the processor 220 of FIG. 2) of an electronic device (e.g., the electronic device 101 of FIG. 1 or the electronic device 201 of FIG. 2) may perform at least one of operations 1810 to 1840.

In operation 1810, according to an embodiment, the processor 220 may display a first character object corresponding to a first state on the display 260. For example, the processor 220 may display, on the display 260, a first character object corresponding to the highest-priority first state according to priority, identified among the plurality of states. For example, the processor 220 may register, with an external server, information (or data) associated with the first character object corresponding to the first state being currently displayed on the display 260. The information (or data) associated with the first character object corresponding to the first state of the electronic device registered with the external server may be provided to another user permitted by the user or an electronic device registered as the user's friend.

In operation 1820, according to an embodiment, the processor 220 may identify that the friend approaching state is identified. For example, the processor 220 may identify an external electronic device which approaches within a designated distance (e.g., 50 m) through the sensor module 212 (e.g., a position sensor and/or a proximity sensor) and/or the communication module 214 (e.g., a short-range communication module) and identify whether the approaching external electronic device is an electronic device of a pre-registered friend. For example, the friend is merely an example, and the pre-registered friend may be another user designated by the user. For example, the processor 220 may obtain an electronic device identifier (ID) or user ID or account information from the external electronic device through communication and, if the electronic device ID, user ID, or account ID of the approaching external electronic device corresponds to the pre-registered friend, identify that the approaching external electronic device is the electronic device of the pre-registered friend and identify the friend approaching state. For example, if the friend approaching state is newly identified, the processor 220 may change the priority and identify the friend approaching state as the highest-priority state among the plurality of states.

In operation 1830, according to an embodiment, the processor 220 may obtain a second character object corresponding to the friend based on identifying the friend approaching state. For example, the processor 220 may obtain data elements of the second character object corresponding to the friend using the character object elements stored in the memory 240 or obtain the data elements of the second character object corresponding to the friend through communication from the external server. As another example, the processor 220 may receive some data elements (e.g., character model data and clothes data) of the second character object corresponding to the friend from the external server and select some other data elements (e.g., face motion data and body motion data) from among the face motion data and body motion data stored in the memory 240, obtaining the data elements of the second character object corresponding to the friend.

In operation 1840, according to an embodiment, the processor 220 may display, on the display 260, the first character object corresponding to the first state and the second character object corresponding to the friend. For example, the processor 220 may display the first character object which is running and corresponds to the user's running state while simultaneously displaying the second character object of the approaching friend.

Figure 19:
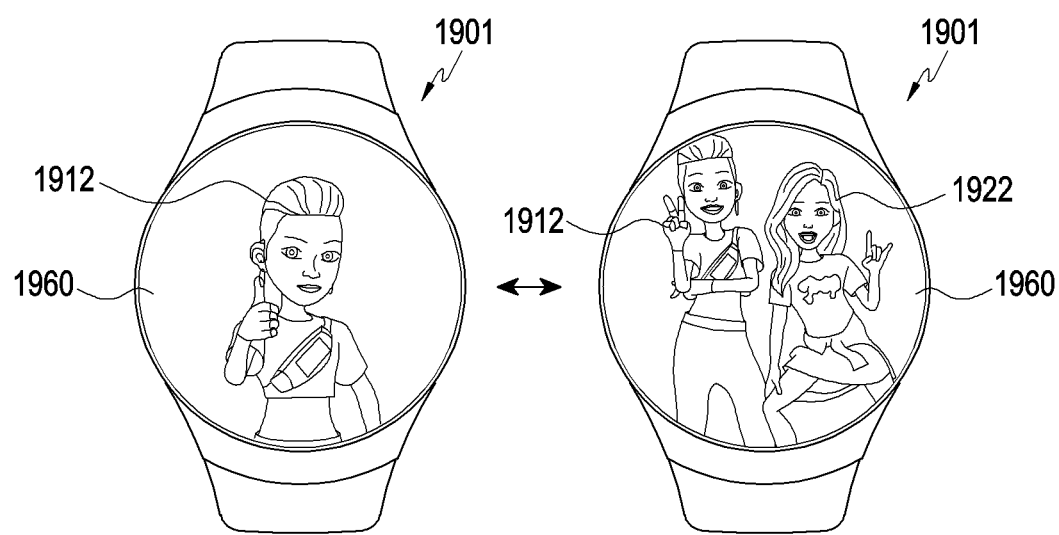
FIG. 19 is a view illustrating an example of displaying a second character object corresponding to a friend on a display upon identifying a friend approaching state in an electronic device according to an embodiment of the disclosure.

FIG. 19 is a view illustrating an example of displaying a second character object corresponding to a friend on a display upon identifying a friend approaching state in an electronic device according to an embodiment of the disclosure.

Referring to FIG. 19, according to an embodiment, an electronic device (e.g., the electronic device 101 of FIG. 1 or the electronic device 201 of FIG. 2) may be a wearable device 1901 (e.g., a smart watch).

According to an embodiment, a processor (e.g., the processor 120 of FIG. 1 or the processor 220 of FIG. 2) of the wearable device 1901 may identify a friend approaching state while displaying, as a 3D animation, a first character object 1912 corresponding to a first state, on a display 1960 (e.g., the display module 160 of FIG. 1 or the display 260 of FIG. 2).

According to an embodiment, upon identifying the friend approaching state while displaying the first character object 1912 as a 3D animation, the processor 220 may obtain data elements of a second character object corresponding to the friend using character object elements stored in the memory 240, obtain data elements of the second character object corresponding to the friend through communication from an external server, and display, on the display 1960, the first character object 1912 and the second character object 1922 corresponding to the friend, together, using the obtained data elements of the second character object.

Figure 20A:
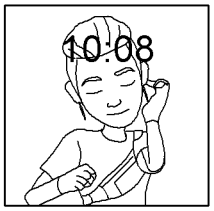
FIG. 20A is a view illustrating an example of a three-dimensional (3D) animation of a character object corresponding to each of a play state, an inactive state, and a running state according to an embodiment of the disclosure.
Figure 20A:
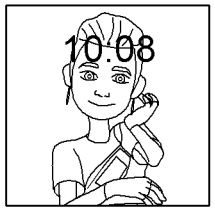
Figure 20A:
Figure 20A:
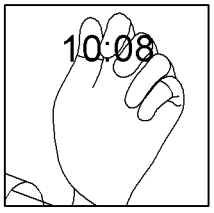
Figure 20A:
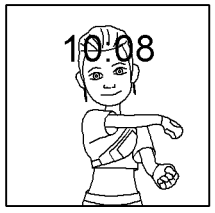
Figure 20A:
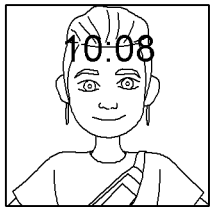
Figure 20A:
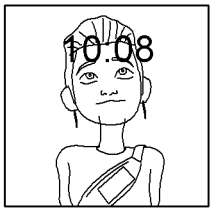
Figure 20A:
Figure 20A:
Figure 20A:
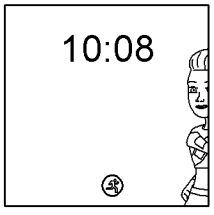
Figure 20A:
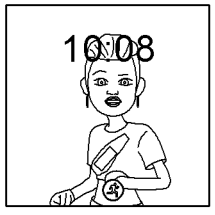
Figure 20A:

FIGS. 20A, 20B, and 20C are views illustrating an example of a 3D animation of a character object corresponding to each of a plurality of states according to various embodiments of the disclosure.

FIG. 20A is a view illustrating an example of a 3D animation of a character object corresponding to each of a play state, an inactive state, and a run state according to an embodiment of the disclosure.

Referring to FIG. 20A, according to an embodiment, the 3D animation of the character object in the play state may include scenes indicating that the character model listens to music. According to an embodiment, the 3D animation of the character object in the inactive state may include scenes indicating that the character model is in the inactive state. According to an embodiment, the 3D animation of the character object in the inactive state may be implemented to have a 3D animation of a plurality of different character objects for one inactive state, such as inactive A state and inactive B state. According to an embodiment, the 3D animation of the character object in the run state may include scenes indicating that the character model is running.

FIG. 20B is a view illustrating an example of a 3D animation of a character object corresponding to each of a low battery state, a notification state, and a walking state according to an embodiment of the disclosure.

Referring to FIG. 20B, according to an embodiment, the 3D animation of the character object in the low battery state may include scenes that the character model performs the operation capable of indicating that the electronic device is in low battery. According to an embodiment, the 3D animation of the character object in the notification state may include scenes indicating the presence of a notification not read by the character model. According to an embodiment, the 3D animation of the character object in the notification state may be implemented to have a 3D animation of a plurality of different character objects for one notification state, such as notification A state and notification B state. According to an embodiment, the 3D animation of the character object in the walk state may include scenes indicating that the character model is walking.

FIG. 20C is a view illustrating an example of a 3D animation of a character object corresponding to an idle state according to an embodiment of the disclosure.

Referring to FIG. 20C, according to an embodiment, the 3D animation of the character object in the idle state may include scenes that the character model performs the operation capable of indicating that the electronic device is in the idle state. According to an embodiment, the 3D animation of the character object in the idle state may be implemented to have a 3D animation of a plurality of different character objects for one idle state, such as normal A state, normal B state, and normal C state.

According to an embodiment, it may be apparent to one of ordinary skill in the art that in addition to the 3D animation of the character object corresponding to each of the plurality of states, there may be more 3D animations of character objects corresponding to other states than the states in the examples of FIGS. 20A to 20C. It may be apparent to one of ordinary skill in the art that in the examples of FIGS. 20A to 20C, the 3D animation of the character object may be implemented in a different design that may properly represent each state.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic device is not limited to the above-listed embodiments.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked.

The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to various embodiments, there may be provided a non-volatile storage medium storing instructions, which may be configured to, when executed by an electronic device, cause the electronic device to perform operations comprising identifying a plurality of states based on at least one of information obtained through a sensor module of the electronic device, information received from an external electronic device through a communication module of the electronic device, or information associated with a function of the electronic device, identifying priorities of the plurality of states, identifying a first state among the plurality of states based on the identified priorities, identifying whether there is a second state mergeable with the first state, and controlling to display a first character object corresponding to the first state or a third character object corresponding to a merge of the first state and the second state, based on whether there is the second state mergeable with the first state.

While the disclosure has been shown and described with reference to various embodiments thereof, it will be understood by those skilled in the art that various changes in form and detail may be made therein without departing from the spirit and scope of the disclosure as defined by the appended claims and their equivalents.

What is claimed is:

1. An electronic device comprising:
   a sensor;
   communication circuitry;
   a display;
   memory configured to store instructions; and
   at least one processor,
   wherein the instructions are configured to, when executed by the at least one processor, cause the electronic device to:
   obtain first information through the sensor,
   receive second information from an external electronic device through the communication circuitry,
   identify a plurality of states of the electronic device based on at least one of first information obtained through the sensor, second information received from the external electronic device through the communication circuitry, or third information associated with a function executed on the electronic device,
   determine priorities of the plurality of states of the electronic device based on a designated priority reference,
   identify whether there is a second state mergeable with a first state of a first priority to be displayed on the display among the plurality of states of the electronic device, and
   display, on the display, a first character object corresponding to the first state or a third character object corresponding to a merge of the first state and the second state, based on whether there is the second state mergeable with the first state.

2. The electronic device of claim 1, wherein at least one of the first character object or the third character object includes a three-dimensional (3D) animation.

3. The electronic device of claim 1, wherein the instructions are further configured to, when executed by the at least one processor, cause the electronic device to obtain a state list including the plurality of states of the electronic device.

4. The electronic device of claim 3, wherein the instructions are further configured to, when executed by the least one processor, cause the electronic device to:
   add a new state to the state list upon identifying entry into the new state based on a state enter condition, and
   delete an existing state from the state list upon identifying exit from the existing state based on a state exit condition.

5. The electronic device of claim 3, wherein the instructions are further configured to, when executed by the least one processor, cause the electronic device to identify the priorities of the plurality of states of the electronic device on the state list based on the designated priority reference.

6. The electronic device of claim 5, wherein the designated priority reference includes at least one of chronological order, importance, user preference, or a level value of each state.

7. The electronic device of claim 1, wherein the plurality of states of the electronic device include at least one of a state of the electronic device, a state of the external electronic device, a user state, or an ambient environment state.

8. The electronic device of claim 1, wherein the instructions are further configured to, when executed by the least one processor, cause the electronic device to:

obtain a first character object data element for rendering the first character object corresponding to the first state, and display, on the display, the first character object using the obtained first character object data element.

9. The electronic device of claim 8, wherein the first character object data element includes at least one of a character model, clothing, an additional object, a face motion, a body motion, a camera motion, a space, or a graphic panel.

10. The electronic device of claim 1, wherein the instructions are further configured to, when executed by the least one processor, cause the electronic device to:

obtain a first character object data element for rendering the first character object corresponding to the first state and a second character object data element for rendering a second character object corresponding to the second state, merge at least part of the first character object data element and at least part of the second character object data element, and display, on the display, the third character object corresponding to the merge.

11. A method performed by an electronic device for displaying a character object based on priorities of a plurality of states in the electronic device, the method comprising:

identifying the plurality of states of the electronic device based on at least one of information obtained through a sensor module of the electronic device, information received from an external electronic device through a communication module of the electronic device, or information associated with a function executed on the electronic device;

determining the priorities of the plurality of states of the electronic device based on a designated priority reference;

identifying whether there is a second state mergeable with a first state of a first priority to be displayed on the display among the plurality of states of the electronic device; and displaying a first character object corresponding to the first state or a third character object corresponding to a merge of the first state and the second state, based on whether there is the second state mergeable with the first state.

12. The method of claim 11, wherein at least one of the first character object or the third character object includes a three-dimensional (3D) animation.

13. The method of claim 11, further comprising obtaining a state list including the plurality of states of the electronic device.

14. The method of claim 13, further comprising:
adding a new state to the state list upon identifying entry into the new state based on a state enter condition; and deleting an existing state from the state list upon identifying exit from the existing state based on a state exit condition.

15. The method of claim 13, further comprising identifying the priorities of the plurality of states of the electronic device on the state list based on the designated priority reference.

16. The method of claim 15, wherein the designated priority reference includes at least one of chronological order, importance, user preference, or a level value of each state.

17. The method of claim 11, wherein the plurality of states of the electronic device include at least one of a state of the electronic device, a state of the external electronic device, a user state, or an ambient environment state.

18. The method of claim 11, further comprising:
obtaining a first character object data element for rendering the first character object corresponding to the first state; and displaying the first character object using the obtained first character object data element.

19. The method of claim 11, further comprising:
obtaining a first character object data element for rendering the first character object corresponding to the first state and a second character object data element for rendering a second character object corresponding to the second state;

merging at least part of the first character object data element and at least part of the second character object data element; and displaying the third character object corresponding to the merge.

20. A non-volatile storage medium storing instructions, which are configured to, when executed by an electronic device, cause the electronic device to perform operations comprising:

identifying a plurality of states of the electronic device based on at least one of information obtained through a sensor module of the electronic device, information received from an external electronic device through a communication module of the electronic device, or information associated with a function executed on the electronic device;

determining priorities of the plurality of states of the electronic device based on a designated priority reference;

identifying whether there is a second state mergeable with a first state of a first priority to be displayed on a display among the plurality of states of the electronic device; and display, on the display, a first character object corresponding to the first state or a third character object corresponding to a merge of the first state and the second state, based on whether there is the second state mergeable with the first state.

* * * * *